US010834517B2

(12) United States Patent
Vilermo et al.

(10) Patent No.: US 10,834,517 B2
(45) Date of Patent: Nov. 10, 2020

(54) AUDIO RECORDING AND PLAYBACK APPARATUS

(71) Applicant: Nokia Technologies Oy, Espoo (FI)

(72) Inventors: Miikka Tapani Vilermo, Siuro (FI); Lasse Juhani Laaksonen, Tampere (FI); Kari Juhani Järvinen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/782,681

(22) PCT Filed: Apr. 10, 2013

(86) PCT No.: PCT/IB2013/052855
§ 371 (c)(1),
(2) Date: Oct. 6, 2015

(87) PCT Pub. No.: WO2014/167384
PCT Pub. Date: Oct. 16, 2014

(65) Prior Publication Data
US 2016/0219392 A1 Jul. 28, 2016

(51) Int. Cl.
*H04R 5/02* (2006.01)
*H04S 7/00* (2006.01)
(Continued)

(52) U.S. Cl.
CPC .............. *H04S 7/301* (2013.01); *G06F 3/165* (2013.01); *H04R 5/02* (2013.01); *H04R 5/04* (2013.01);
(Continued)

(58) Field of Classification Search
CPC .......................... H04S 7/303; H04R 2205/024
(Continued)

(56) References Cited

U.S. PATENT DOCUMENTS 6,882,335 B2   4/2005 Saarinen
7,991,176 B2   8/2011 Kirkeby
(Continued)

FOREIGN PATENT DOCUMENTS

CN   1469618 A   1/2004
CN   1741601 A   3/2006
(Continued)

OTHER PUBLICATIONS

International Search Report and Written Opinion received for corresponding Patent Cooperation Treaty Application No. PCT/IB2013/052855, dated Mar. 28, 2014, 12 pages.
(Continued)

*Primary Examiner* — George C Monikang
(74) *Attorney, Agent, or Firm* — Alston & Bird LLP

(57) ABSTRACT

An apparatus comprising: an input configured to receive at least two audio signals, the at least two audio signals having a relative displacement between them; an orientation determiner configured to determine an audio capture orientation based on a device orientation and information concerning microphone configuration in the apparatus; and an audio output generator configured to output the at least two audio signals based on the capture orientation, such that playback of the at least two audio signals is performed based on the capture orientation.

21 Claims, 28 Drawing Sheets

(51) Int. Cl.
    *G06F 3/16* (2006.01)
    *H04R 5/04* (2006.01)
    *H04R 29/00* (2006.01)

(52) U.S. Cl.
    CPC ............. *H04R 29/004* (2013.01); *H04S 7/30* (2013.01); *H04R 2420/01* (2013.01); *H04R 2420/03* (2013.01); *H04R 2499/11* (2013.01)

(58) Field of Classification Search
    USPC .................................. 381/300, 303, 304, 310
    See application file for complete search history.

(56) References Cited

U.S. PATENT DOCUMENTS

| | | | |
|---|---|---|---|
| 8,243,967 B2 | 8/2012 | Kirkeby et al. | |
| 2001/0050995 A1* | 12/2001 | Belt | H04S 1/002 381/98 |
| 2003/0161479 A1* | 8/2003 | Yang | H04S 3/02 381/22 |
| 2004/0204194 A1 | 10/2004 | Akai et al. | |
| 2006/0002567 A1* | 1/2006 | Yusa | H04S 3/008 381/58 |
| 2006/0044419 A1 | 3/2006 | Ozawa | |
| 2008/0044033 A1 | 2/2008 | Ozawa | |
| 2008/0146289 A1 | 6/2008 | Korneluk et al. | |
| 2008/0187148 A1 | 8/2008 | Itabashi et al. | |
| 2009/0128617 A1* | 5/2009 | Zhan | G01S 3/8034 348/14.12 |
| 2010/0009721 A1 | 1/2010 | Chien et al. | |
| 2011/0002487 A1 | 1/2011 | Panther et al. | |
| 2011/0069229 A1 | 3/2011 | Lord | |
| 2011/0142253 A1 | 6/2011 | Hata et al. | |
| 2011/0150247 A1 | 6/2011 | Oliveras | |
| 2011/0264715 A1 | 10/2011 | Singer et al. | |
| 2011/0316768 A1 | 12/2011 | McRae | |
| 2012/0114154 A1 | 5/2012 | Abrahamsson | |
| 2012/0182429 A1* | 7/2012 | Forutanpour | H04R 3/005 348/175 |
| 2012/0300957 A1 | 11/2012 | Lyubachev | |
| 2012/0308056 A1 | 12/2012 | Nakayama | |
| 2013/0028446 A1 | 1/2013 | Krzyzanowski | |
| 2013/0315402 A1* | 11/2013 | Visser | G10L 19/00 381/18 |
| 2014/0185852 A1 | 7/2014 | Pereira | |

FOREIGN PATENT DOCUMENTS

| | | |
|---|---|---|
| CN | 101163204 A | 4/2008 |
| CN | 101960865 A | 1/2011 |
| CN | 102124754 A | 7/2011 |
| CN | 102160398 A | 8/2011 |
| CN | 102265643 A | 11/2011 |
| CN | 102473172 A | 5/2012 |
| CN | 101242677 B | 7/2012 |
| CN | 102804806 A | 11/2012 |
| CN | 102811406 A | 12/2012 |
| DE | 102006033000 A1 | 1/2008 |
| EP | 1 124 175 A2 | 8/2001 |
| EP | 2 320 677 A1 | 5/2011 |
| EP | 2 760 223 A1 | 7/2014 |
| JP | 2009-260521 A | 11/2009 |
| JP | 2011-139437 A | 7/2011 |
| RU | 2011 121330 A | 12/2012 |
| WO | WO 2011/011737 A1 | 1/2011 |
| WO | WO 2011/076290 A1 | 6/2011 |
| WO | 2012061149 A1 | 5/2012 |
| WO | WO 2012/061151 A1 | 5/2012 |

OTHER PUBLICATIONS

Office Aciton for Canadian Application No. 2,908,654 dated Nov. 18, 2016.
Office Action for Russian Application No. RU 2015145733 dated Feb. 21, 2017.
Office Action from Korean Patent Application No. 2015-7031796 dated Apr. 19, 2017.
Office Action for Chinese Application No. 201380077289.0 dated Aug. 31, 2016.
Rich Communication Suite 5.1 Advanced Communications Services and Client Specification, Version 1.0, GSM Association (Aug. 13, 2012) 433 pages.
3GPP TSG-SA4 AdHoc, S4-AHM179, Qualcomm Incorporated (Oct. 4, 2012) 9 pages.
SA4 MTSI SWG Conference Call on CVO, Tdoc S4-AHM182, Ericsson et al. (Oct. 4, 2012) 9 pages.
3GPP SA4 MTSI CVO Telco, S4-AHIM181, *A Proposal for Coordination of Video Orientation*, Research in Motion UK Limited (Oct. 4, 2012) 5 pages.
Singer, D. et al., *A General Mechanism for RTP Header Extensions*, RFC 5285 (Jul. 2008) 17 pages.
Supplementary European Search Report for EP Application No. 13 88 1823 dated Feb. 23, 2017.
Herre, J. et al., *Interactive Teleconferencing Combining Spatial Audio Object Coding and DirAC Technology*, JAES, AES, vol. 59. No. 12 (Dec. 1, 2011).
Office Action for Chinese Application No. 201380077289.0 dated Apr. 26, 2017.
Office Action for Canadian Application No. 2,908,654 dated Oct. 3, 2017, 4 pages.
Office Action for Chinese Application No. 2013 80077289.0 dated Oct. 19, 2017, 9 pages.
Office Action for Korean Application No. 2015-7031796 dated Oct. 18, 2017, 7 pages.
Office Action for Russian Application No. 2015145733 dated Nov. 10, 2017, 5 pages.
Office Action from European Patent Application No. 13881823.2 dated Mar. 19, 2018, 7 pages.
Office Action from Korean Patent Application No. 2017-7036379 dated Feb. 8, 2018, 8 pages.
Office Action for Korean Application No. 10-2015-7031796 dated Dec. 26, 2017.
Office Action for Korean Application No. 10-2017-7036379 dated Aug. 27, 2018.
Office Action for European Application No. 13881823.2 dated Oct. 12, 2018.
Office Action for Korean Application No. 10-2017-7036379 dated Oct. 17, 2018.
Office Action for Indian Application No. 6843/CHENP/2015 dated Jan. 22, 2019, 6 pages.
Office Action European Application No. 13881823.2 dated Sep. 3, 2019.
CN Application No. 201810003930.0, First Office Action dated Nov. 4, 2019.
European Patent Office, Summons to Attend Oral Proceedings pursuant to Rule 115(1) EPC, including Annexes with the full translations of the above JP publications, for Application No. 13881823.2, Jun. 2, 2020, 48 pages, Netherlands.
China National Intellectual Property Administration, Second Office Action received for CN Application No. 201810003930.0, dated Jul. 23, 2020, 6 pages, PRC.

* cited by examiner

AUDIO RECORDING AND PLAYBACK APPARATUS

RELATED APPLICATION

This application was originally filed as Patent Cooperation Treaty Application No. PCT/IB2013/052855 filed Apr. 10, 2013.

FIELD

The present application relates to apparatus for audio recording and playback. The invention further relates to, but is not limited to, apparatus for audio recording and playback within mobile devices.

BACKGROUND

Spatial audio signals are being used in greater frequency to produce a more immersive audio experience. A stereo or multi-channel recording can be passed from the recording or capture apparatus to a listening apparatus and replayed using a suitable multi-channel output such as a multi-channel loudspeaker arrangement and with virtual surround processing a pair of stereo headphones or headset.

It would be understood that in the near future it will be possible for mobile apparatus such as mobile phones to have more than two microphones. This offers the possibility to record real multichannel audio. Similarly it will be possible for mobile apparatus such as mobile phones to have more than two speakers. Thus stereophonic and surround sound audio can be reproduced in mobile devices (such as smartphones).

In other words it is or will shortly be possible that mobile devices will have the capacity to record (or capture) and play back stereophonic and surround sound audio. Thus mobile devices will also be capable of passing these audio signals from device to device and as such can employ stereophonic and surround sound audio in telecommunication applications and also for other services such as streaming, broadcasting and multicasting when the audio recording or capture has been performed by a suitable or capable mobile device.

SUMMARY

Aspects of this application thus provide a spatial audio capture and processing whereby listening orientation or video and audio capture orientation differences can be compensated for.

According to a first aspect there is provided a method comprising: generating at least two audio signals, the at least two audio signals having a relative displacement between them; determining a capture orientation; and outputting the at least two audio signals based on the capture orientation, such that playback of the at least two audio signals is performed based on the capture orientation.

Determining a capture orientation may comprise determining an audio capture orientation based on device orientation and information concerning microphone configuration in a capture apparatus.

The capture orientation may be an initial capture orientation value, and outputting the at least two audio signals based on the capture orientation may comprise outputting the at least two audio signals according to an initial audio output order.

The method may further comprise: determining if the difference between the capture orientation and an earlier orientation is greater than a defined value; and further outputting the capture orientation with the at least two audio signals, such that the playback of the at least two audio signals is performed based on the capture orientation.

The earlier orientation may be an initial orientation.

The method may further comprise: determining an audio output order for the at least two audio signals based on the capture orientation; and further outputting the audio output order with the at least two audio signals, such that the playback of the at least two audio signals is further performed based on the audio output order.

The method may further comprise: determining if the difference between the capture orientation and the earlier orientation is greater than a defined audio output re-ordering value, and triggering the determining of the audio output order when the difference between the capture orientation and the earlier orientation is greater than a defined audio output re-ordering value.

Generating the at least two audio signals having a relative displacement between them may comprise: generating a first of the at least two audio signals with a first microphone at a first location; generating a second of the at least two audio signals with a second microphone at a second location, the relative displacement between the at least two audio signals being the displacement between the first location and the second location.

Generating the at least two audio signals having a relative displacement between them may comprise at least one of: receiving the at least two audio signals from a remote apparatus comprising at least two microphones having the relative displacement between them; and receiving the at least two audio signals from a memory.

According to a second aspect there is provided a method comprising: receiving at least two audio signals; determining a playback orientation; and outputting the at least two audio signals to at least two speakers based on the playback orientation.

The method may further comprise receiving a capture orientation associated with the at least two audio signals, and wherein outputting the at least two audio signals to the at least two speakers is further based on the capture orientation.

The method may further comprise: receiving an audio output order for the at least two audio signals based on the capture orientation, wherein outputting the at least two audio signals to the at least two speakers is further based on the audio output order.

Outputting the at least two audio signals to at least two speakers may comprise at least one of: routing the at least two audio signals to the at least two speakers based on the playback orientation; and mixing the at least two audio signals to generate a downmixed audio signal to be output to at least one of the at least two speakers.

The at least two speakers may comprise at least one of: a loudspeaker; a headphone; a headset; an earpiece set; an external loudspeaker; and an integrated hands free speaker.

According to a third aspect there is provided an apparatus comprising at least one processor and at least one memory including computer code for one or more programs, the at least one memory and the computer code configured to with the at least one processor cause the apparatus to at least: generate at least two audio signals, the at least two audio signals having a relative displacement between them; determine a capture orientation; and output the at least two audio signals based on the capture orientation, such that playback of the at least two audio signals is performed based on the capture orientation.

Determining a capture orientation may cause the apparatus to determine an audio capture orientation based on device orientation and information concerning microphone configuration in the capture apparatus.

The capture orientation may be an initial capture orientation value, and outputting the at least two audio signals based on the capture orientation may cause the apparatus to output the at least two audio signals according to an initial audio output order.

The apparatus may be further caused to: determine if the difference between the capture orientation and an earlier orientation is greater than a defined value; and further output the capture orientation with the at least two audio signals, such that the playback of the at least two audio signals is performed based on the capture orientation.

The earlier orientation may be an initial orientation.

The apparatus may be further caused to: determine an audio output order for the at least two audio signals based on the capture orientation; and further outputting the audio output order with the at least two audio signals, such that the playback of the at least two audio signals is further performed based on the audio output order.

The apparatus may be further caused to: determine the difference between the capture orientation and the earlier orientation is greater than a defined audio output re-ordering value, and trigger the determining of the audio output order when the difference between the capture orientation and the earlier orientation is greater than a defined audio output re-ordering value.

Generating the at least two audio signals having a relative displacement between them may cause the apparatus to: generate a first of the at least two audio signals with a first microphone at a first location; and generate a second of the at least two audio signals with a second microphone at a second location, the relative displacement between the at least two audio signals being the displacement between the first location and the second location.

Generating the at least two audio signals having a relative displacement between them may cause the apparatus to perform at least one of: receive the at least two audio signals from a remote apparatus comprising at least two microphones having the relative displacement between them; and receive the at least two audio signals from a memory.

According to a fourth aspect there is provided an apparatus comprising at least one processor and at least one memory including computer code for one or more programs, the at least one memory and the computer code configured to with the at least one processor cause the apparatus to; receive at least two audio signals; determine a playback orientation; and output the at least two audio signals to at least two speakers based on the playback orientation.

The apparatus may be further caused to receive a capture orientation associated with the at least two audio signals, and wherein outputting the at least two audio signals to the at least two speakers is further based on the capture orientation.

The apparatus may be further caused to: receive an audio output order for the at least two audio signals based on the capture orientation, wherein outputting the at least two audio signals to the at least two speakers may be further based on the audio output order.

Outputting the at least two audio signals to at least two speakers may cause the apparatus to perform at least one of: route the at least two audio signals to the at least two speakers based on the playback orientation; and mix the at least two audio signals to generate a downmixed audio signal to be output to at least one of the at least two speakers.

The at least two speakers comprise at least one of: a loudspeaker; a headphone; a headset; an earpiece set; an external loudspeaker; and an integrated hands free speaker.

According to a fifth aspect there is provided an apparatus comprising: means for generating at least two audio signals, the at least two audio signals having a relative displacement between them; means for determining a capture orientation; and means for outputting the at least two audio signals based on the capture orientation, such that playback of the at least two audio signals is performed based on the capture orientation.

The means for determining a capture orientation may comprise means for determining an audio capture orientation based on device orientation and information concerning microphone configuration in the capture apparatus.

The capture orientation may be an initial capture orientation value, and the means for outputting the at least two audio signals based on the capture orientation may comprise means for outputting the at least two audio signals according to an initial audio output order.

The apparatus may further comprise: means for determining if the difference between the capture orientation and an earlier orientation is greater than a defined value; and the means for outputting may comprise means for outputting the capture orientation with the at least two audio signals, such that the playback of the at least two audio signals is performed based on the capture orientation.

The earlier orientation may be an initial orientation.

The apparatus may further comprise: means for determining an audio output order for the at least two audio signals based on the capture orientation; and the means for outputting may comprise means for further outputting the audio output order with the at least two audio signals, such that the playback of the at least two audio signals is further performed based on the audio output order.

The apparatus may further comprise: means for determining the difference between the capture orientation and the earlier orientation is greater than a defined audio output re-ordering value, and means for triggering the determining of the audio output order when the difference between the capture orientation and the earlier orientation is greater than a defined audio output re-ordering value.

The means for generating the at least two audio signals having a relative displacement between them may comprise: means for generating a first of the at least two audio signals with a first microphone at a first location; and means for generating a second of the at least two audio signals with a second microphone at a second location, the relative displacement between the at least two audio signals being the displacement between the first location and the second location.

The means for generating the at least two audio signals having a relative displacement between them may comprise at least one of: means for receiving the at least two audio signals from a remote apparatus comprising at least two microphones having the relative displacement between them; and means for receiving the at least two audio signals from a memory.

According to a sixth aspect there is provided an apparatus comprising: means for receiving at least two audio signals; means for determining a playback orientation; and means for outputting the at least two audio signals to at least two speakers based on the playback orientation.

The apparatus may further comprise means for receiving a capture orientation associated with the at least two audio signals, and wherein the means for outputting the at least two audio signals to the at least two speakers is further based on the capture orientation.

The apparatus may further comprise: means for receiving an audio output order for the at least two audio signals based on the capture orientation, wherein the means for outputting the at least two audio signals to the at least two speakers may be further based on the audio output order.

The means for outputting the at least two audio signals to at least two speakers may comprise at least one of: means for routing the at least two audio signals to the at least two speakers based on the playback orientation; and means for mixing the at least two audio signals to generate a downmixed audio signal to be output to at least one of the at least two speakers.

The at least two speakers comprise at least one of: a loudspeaker; a headphone; a headset; an earpiece set; an external loudspeaker; and an integrated hands free speaker.

According to a seventh aspect there is provided an apparatus comprising: an input configured to receive at least two audio signals, the at least two audio signals having a relative displacement between them; an orientation sensor determiner configured to determine an audio capture orientation based on device orientation and information concerning microphone configuration in the capture apparatus; and an audio output generator configured to output the at least two audio signals based on the capture orientation, such that playback of the at least two audio signals is performed based on the capture orientation.

The capture orientation may be an initial capture orientation value, and the audio output generator may be configured to output the at least two audio signals according to an initial audio output order.

The apparatus may further comprise: an orientation comparator configured to determine if the difference between the capture orientation and an earlier orientation is greater than a defined value; and an audio orientation signal generator configured to further output the capture orientation with the at least two audio signals, such that the playback of the at least two audio signals is performed based on the capture orientation.

The earlier orientation may be an initial orientation.

The audio output generator may be configured to determine an audio output order for the at least two audio signals based on the capture orientation; and further be configured to output the audio output order with the at least two audio signals, such that the playback of the at least two audio signals is further performed based on the audio output order.

The apparatus may comprise: an orientation comparator configured to determine the difference between the capture orientation and the earlier orientation is greater than a defined audio output re-ordering value, and further be configured to trigger the determining of the audio output order when the difference between the capture orientation and the earlier orientation is greater than a defined audio output re-ordering value.

The input may be coupled to a first microphone configured to generate a first of the at least two audio signals at a first location; and a second microphone configured to generate a second of the at least two audio signals with a second microphone at a second location, the relative displacement between the at least two audio signals being the displacement between the first location and the second location.

The input may comprise at least one of: an input configured to receive the at least two audio signals from a remote apparatus comprising at least two microphones having the relative displacement between them; and an input configured to receive the at least two audio signals from a memory.

According to an eighth aspect there is provided an apparatus comprising: an input configured to receive at least two audio signals; a channel selector configured to determine a playback orientation; and a channel switch configured to output the at least two audio signals to at least two speakers based on the playback orientation.

The channel selector may be further configured to receive a capture orientation associated with the at least two audio signals and determine a playback orientation based on the capture orientation, and wherein the channel switch is configured to output the at least two audio signals to the at least two speakers is further based on the capture orientation.

The channel selector may be further configured to receive an audio output order for the at least two audio signals based on the capture orientation, determine a playback orientation based on the audio output order for the at least two audio signals and capture orientation wherein the channel switch is configured to output the at least two audio signals to the at least two speakers may be further based on the audio output order.

The channel switch may comprise at least one of: a router configured to route the at least two audio signals to the at least two speakers based on the playback orientation; and a mixer configured to mix the at least two audio signals to generate a downmixed audio signal to be output to at least one of the at least two speakers.

The at least two speakers comprise at least one of: a loudspeaker; a headphone; a headset; an earpiece set; an external loudspeaker; and an integrated hands free speaker.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For better understanding of the present application, reference will now be made by way of example to the accompanying drawings in which.

EMBODIMENTS

Figure 1:
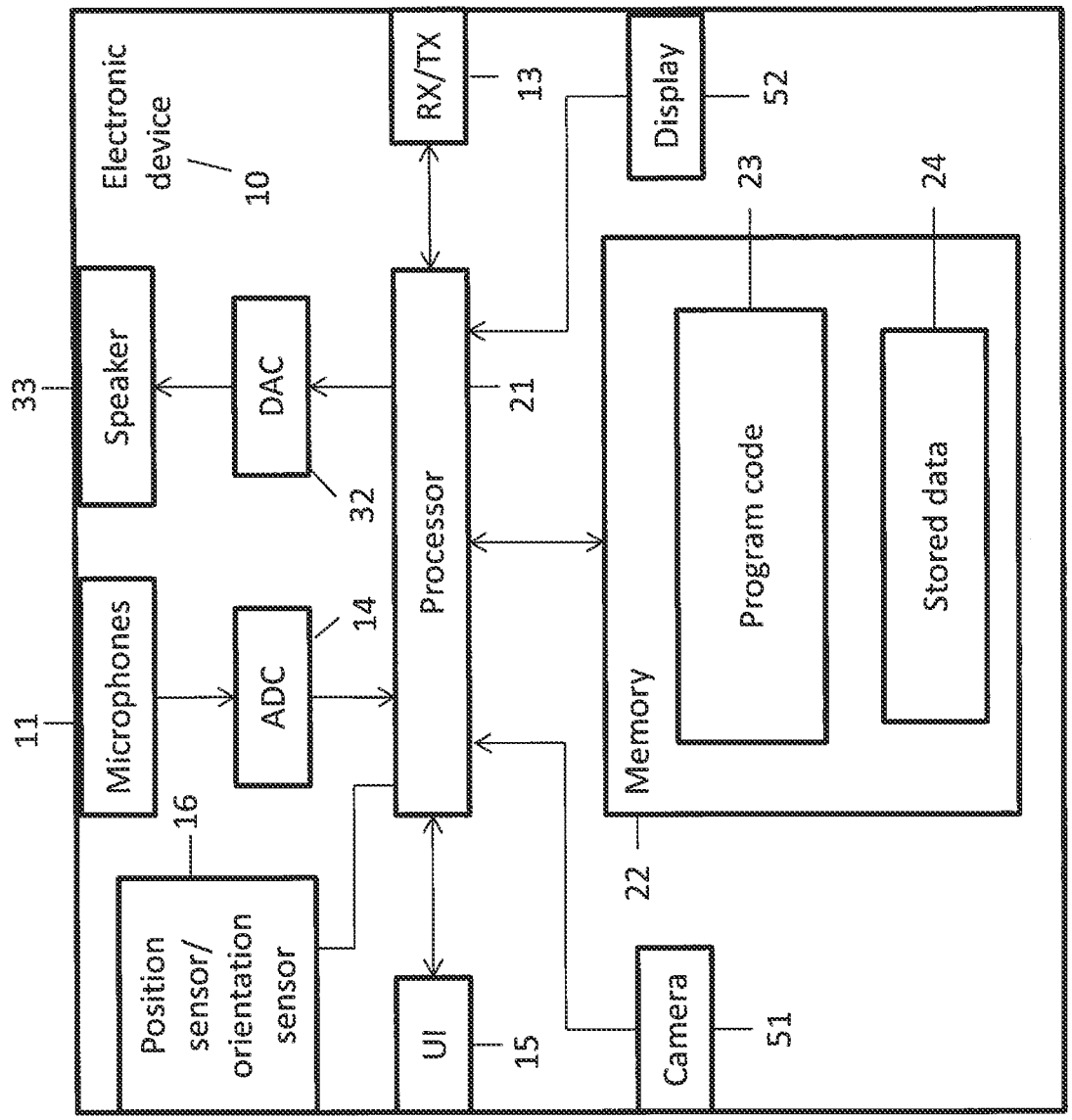
FIG. 1 shows schematically an apparatus suitable for being employed in some embodiments.

The following describes in further detail suitable apparatus and possible mechanisms for the provision of effective sound-field recording and playback for example within audio-video capture and playback apparatus operating over a wireless communications link. In the following examples audio capture and playback is described. However it would be appreciated that in some embodiments the audio capture and playback part of an audio-video system.

As described herein mobile devices or apparatus are more commonly being equipped with multiple microphone configurations or microphone arrays suitable for recording or capturing the audio environment or audio scene surrounding the mobile device or apparatus. A multiple microphone configuration enables the recording of stereo or surround sound signals.

However such mobile devices or apparatus (such as smart phones) are limited in both the number of microphones and their location. As additional microphones increase size and manufacturing cost microphones current designs 're-use' microphones for different applications. For instance, microphone locations at the 'bottom' and 'top' ends can be employed to pick up speech and reference noise in the hand-portable telephone application of the phone and these microphones reused in video/audio recording applications.

Similarly mobile devices or apparatus are more commonly being equipped with multiple speaker configurations suitable for generating a suitable audio environment or audio scene in stereo or multichannel audio formats. However such mobile devices or apparatus (such as smart phones) are also limited in both the number of microphones and their location. There are similar constraints to those for microphones as additional speakers increase size and manufacturing cost.

Therefore when a mobile device is used for capturing audio, the orientation of the device has a significant impact on the quality of the captured audio. For example a stereophonic capable device only able to capture stereophonic audio in one orientation relative to the phone (such as horizontal or vertical orientation due to the location of the microphones) will mean that changing the orientation of the device will also change the 'orientation' of the captured stereophonic audio signal.

For example when capturing video and audio (e.g. during video-telephony calls) the user may sometimes prefer capturing video in portrait orientation and sometimes in landscape orientation, and change between these even during the same call. This can cause issues when the playback or rendering device is unaware of the orientation of the audio capture device and may prevent the correct playback of the stereophonic audio signal. This can therefore reduce the audio quality at the receiving end.

There have been suggested solutions for signaling the orientation of a video capturing device during video capture to guarantee that the captured video image is played in a correct orientation at the receiver during the call without the receiving party needing to manually rotate the playback device to match the capturing device. Furthermore rotating the captured video into a new orientation at the playback device or at receiver side is a relatively simple task since all of the information needed for the rotation exists in the captured video signal. However, the capture/rendering of audio is typically limited to certain orientation (due to the limited number of microphones/speakers and their restricted positions on the device) and may not therefore enable "free" rotation of the captured audio signal at the playback device.

Furthermore the correction of video orientation in future devices using the GSMA Rich Communications Suite (RCS) 5.1 does not properly correct the audio orientation (i.e. the orientation of the captured audio signal) and can make the situation worse since the correction methods proposed may result into the audio and video orientations being out of synchronization (for example a sound source shown at the top of the screen being played out from a speaker located at the right or left hand side of the screen, or the sound source at the left hand side of the screen being played out from the right hand side of the screen).

Thus the concept as described herein in further detail is one which the audio recording system provides optimal pick up and stereo imaging for the desired recording distance whilst minimizing the number of microphones and taking into account limitations in microphone positioning.

The concept as described in further detail herein is to provide a solution to align the use of speakers of the playback or rendering (receiving) device (or headphones or external loudspeakers) to the use of microphones in the recording or capturing (sending) device.

This is achieved in some embodiments by signaling the orientation of audio recording (capture) from the sending device to the receiving device. The signaling in some embodiments can be performed as part of the audio data and sent throughout the transmission or as additional information sent only when the orientation of audio capture changes or when audio capture is performed at non-default orientation (such as vertical capture for stereophonic audio).

In some embodiments as described in further detail herein the concept extends to apparatus and methods for providing the best possible audio quality at the rendering device when misalignment of audio orientation occurs between the capturing and rendering devices.

It would be understood that as described herein the orientation of the audio capture device (at the sending side) is detected by using a gravity sensor and by having knowledge of the audio capture properties of the device (in other words the number of the microphones and their positions together with knowledge about which microphones are used for which device orientation). In some embodiments the inclusion of signaling audio orientation can be performed by using Real Time Protocol (RTP) header extension.

In this regard reference is first made to FIG. 1 which shows a schematic block diagram of an exemplary apparatus or electronic device 10, which may be used to record (or operate as a capture apparatus) or playback (or operate as a rendering apparatus) audio signals.

The electronic device 10 may for example be a mobile terminal or user equipment of a wireless communication system when functioning as the recording apparatus or listening apparatus. In some embodiments the apparatus can be an audio player or audio recorder, such as an MP3 player, a media recorder/player (also known as an MP4 player), or any suitable portable apparatus suitable for recording audio or audio/video camcorder/memory audio or video recorder.

The apparatus 10 can in some embodiments comprise an audio-video subsystem. The audio-video subsystem for example can comprise in some embodiments a microphone or array of microphones 11 for audio signal capture. In some embodiments the microphone or array of microphones can be a solid state microphone, in other words capable of capturing audio signals and outputting a suitable digital format signal in other words not requiring an analogue-to-digital converter. In some other embodiments the microphone or array of microphones 11 can comprise any suitable microphone or audio capture means, for example a condenser microphone, capacitor microphone, electrostatic microphone, electret condenser microphone, dynamic microphone, ribbon microphone, carbon microphone, piezoelectric microphone, or micro electrical-mechanical system (MEMS) microphone. The microphone 11 or array of microphones can in some embodiments output the audio captured signal to an analogue-to-digital converter (ADC) 14.

In some embodiments the apparatus can further comprise an analogue-to-digital converter (ADC) 14 configured to receive the analogue captured audio signal from the microphones and outputting the audio captured signal in a suitable digital form. The analogue-to-digital converter 14 can be any suitable analogue-to-digital conversion or processing means. In some embodiments where the microphones are 'integrated' microphones the microphones contain both audio signal generating and analogue-to-digital conversion capability.

In some embodiments the apparatus 10 audio-video subsystem further comprises a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio-video subsystem can comprise in some embodiments a speaker 33. The speaker 33 can in some embodiments receive the output from the digital-to-analogue converter 32 and present the analogue audio signal to the user. In some embodiments the speaker 33 can be representative of multi-speaker arrangement, a headset, for example a set of headphones, or cordless headphones.

In some embodiments the apparatus audio-video subsystem comprises a camera 51 or image capturing means configured to supply to the processor 21 image data. In some embodiments the camera can be configured to supply multiple images over time to provide a video stream.

In some embodiments the apparatus audio-video subsystem comprises a display 52. The display or image display means can be configured to output visual images which can be viewed by the user of the apparatus. In some embodiments the display can be a touch screen display suitable for supplying input data to the apparatus. The display can be any suitable display technology, for example the display can be implemented by a flat panel comprising cells of LCD, LED, OLED, or 'plasma' display implementations.

Although the apparatus 10 is shown having both audio/video capture and audio/video presentation components, it would be understood that in some embodiments the apparatus 10 can comprise only the audio capture or audio presentation parts of the audio subsystem such that in some embodiments of the apparatus the microphone (for audio capture) or the speaker (for audio playback or presentation) are present.

In some embodiments the apparatus 10 comprises a processor 21. The processor 21 is coupled to the audio-video subsystem and specifically in some examples the analogue-to-digital converter 14 for receiving digital signals representing audio signals from the microphone 11, the digital-to-analogue converter (DAC) 12 configured to output processed digital audio signals, the camera 51 for receiving digital signals representing video signals, and the display 52 configured to output processed digital video signals from the processor 21.

The processor 21 can be configured to execute various program codes. The implemented program codes can comprise for example audio recording and audio presentation routines according to some embodiments as described herein. In some embodiments the program codes can be configured to perform audio signal processing.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data that has been encoded in accordance with the application or data to be encoded via the application embodiments as described later. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments as described herein comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The transceiver 13 can communicate with further apparatus by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the apparatus comprises a position sensor 16 configured to estimate the position of the apparatus 10. The position sensor 16 can in some embodiments be a satellite positioning sensor such as a GPS (Global Positioning System), GLONASS or Galileo receiver.

In some embodiments the positioning sensor can be a cellular ID system or an assisted GPS system.

In some embodiments the apparatus 10 further comprises a direction or orientation sensor. The orientation/direction sensor can in some embodiments be an electronic compass, accelerometer, gyroscope or gravity sensor or be determined by the motion of the apparatus using the positioning estimate.

It is to be understood again that the structure of the electronic device 10 could be supplemented and varied in many ways.

Figure 2:
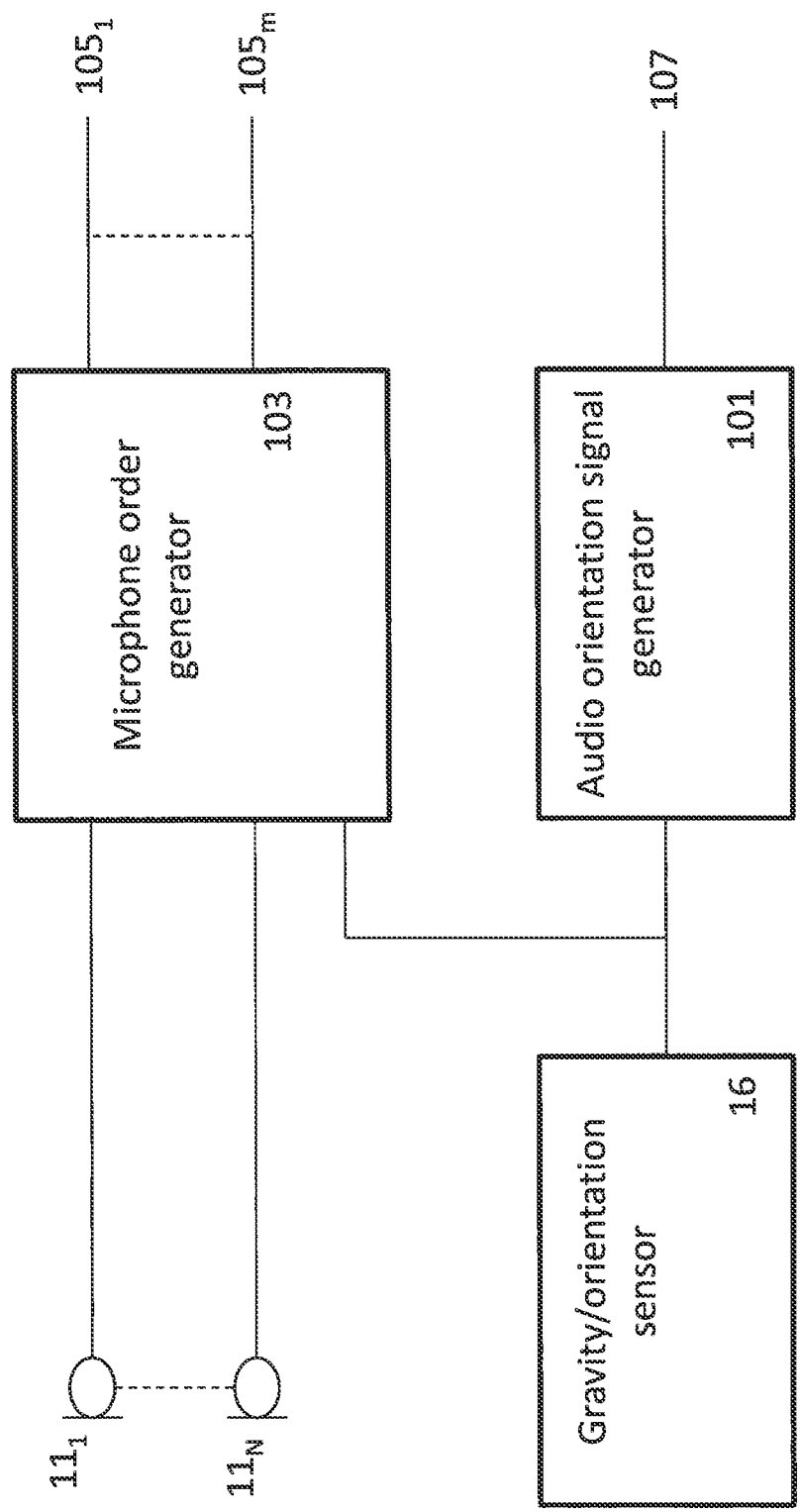
FIG. 2 shows schematically an example audio capture or recording apparatus according to some embodiments.

With respect to FIG. 2 an example audio capture or recording apparatus configuration is shown according to some embodiments. Furthermore with respect to FIGS. 3 and 4 the operation of some embodiments of the audio capture or recording apparatus shown in FIG. 2 is shown in further detail.

In some embodiments the apparatus comprises the array of microphones 11 configured to record or capture the acoustic waves and generate an audio signal for each microphone which can be passed or input to the audio capture apparatus. As described herein in some embodiments the microphones 11 are configured to output an analogue signal which is converted into digital format by the analogue to digital converter (ADC) 14. However the microphones shown in the example herein are integrated microphones configured to output a digital format directly to a microphone order generator 103.

Figure 25:
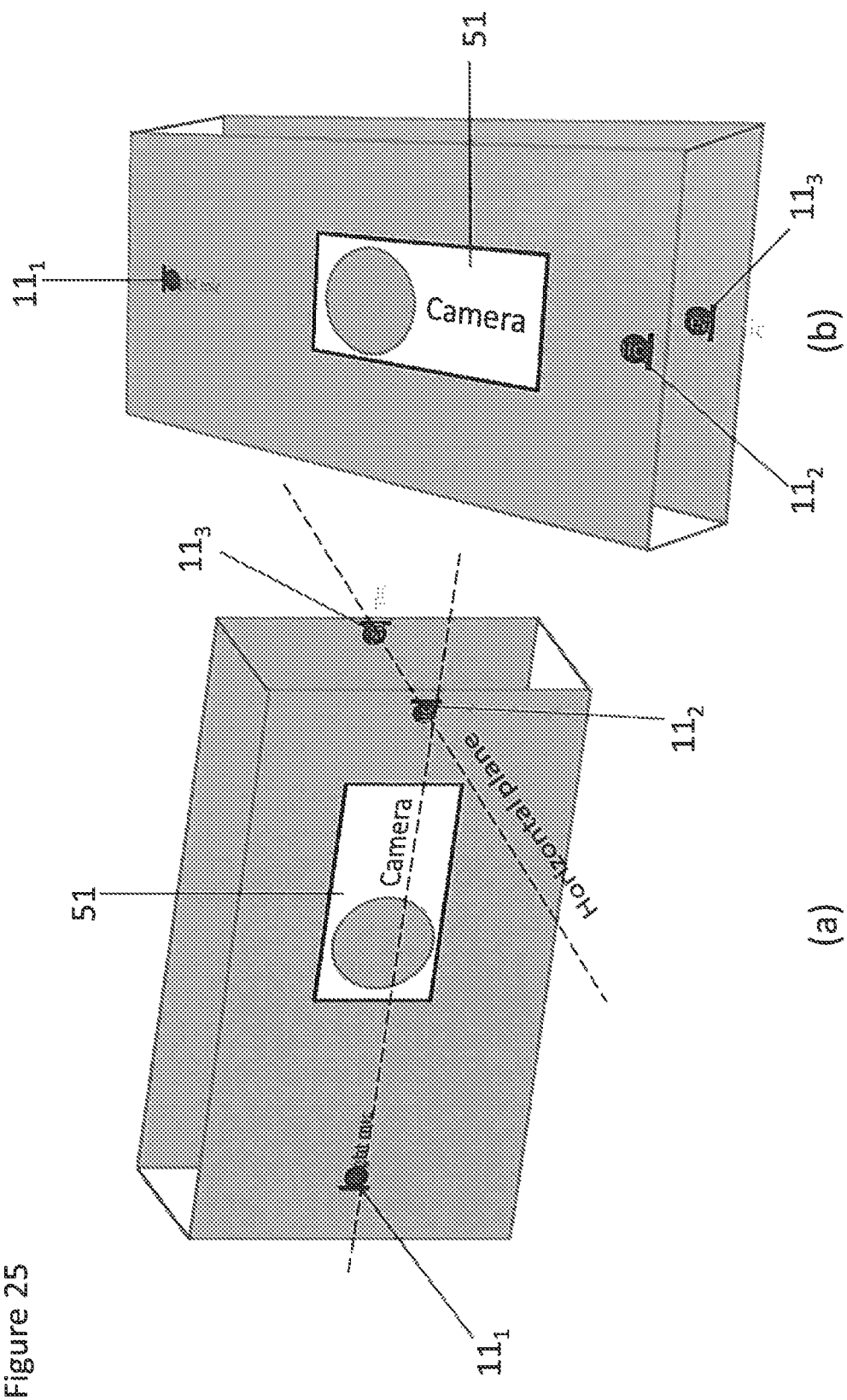
FIG. 25 shows schematically an example 3 microphone capture apparatus configuration according to some embodiments.

In the example shown herein there are N microphones. These microphones can be arranged in some embodiments in any suitable manner. However an example microphone configuration can be shown with respect to FIG. 25 where three microphones are distributed over the apparatus. As shown in FIG. 25 the apparatus comprises three microphones. The first microphone (right microphone) $11_1$, and a second microphone (left microphone) $11_2$ are located on the same 'vertical' plane on the same side of the apparatus as the camera hereby referred to as the front of the device. Furthermore the apparatus comprises a third microphone (left rear microphone) $11_3$ which is located on the same or similar horizontal plane on the opposite side to the front side containing the camera. In other words in conventional use where the camera is located on the opposite side to the display which typically faces of the user in use the left rear microphone $11_3$ is the conventional voice call microphone, and the first and second microphones the noise reducing microphones configured to capture the noise to apply noise reduction or cancellation to the voice call audio signals.

Figure 24:
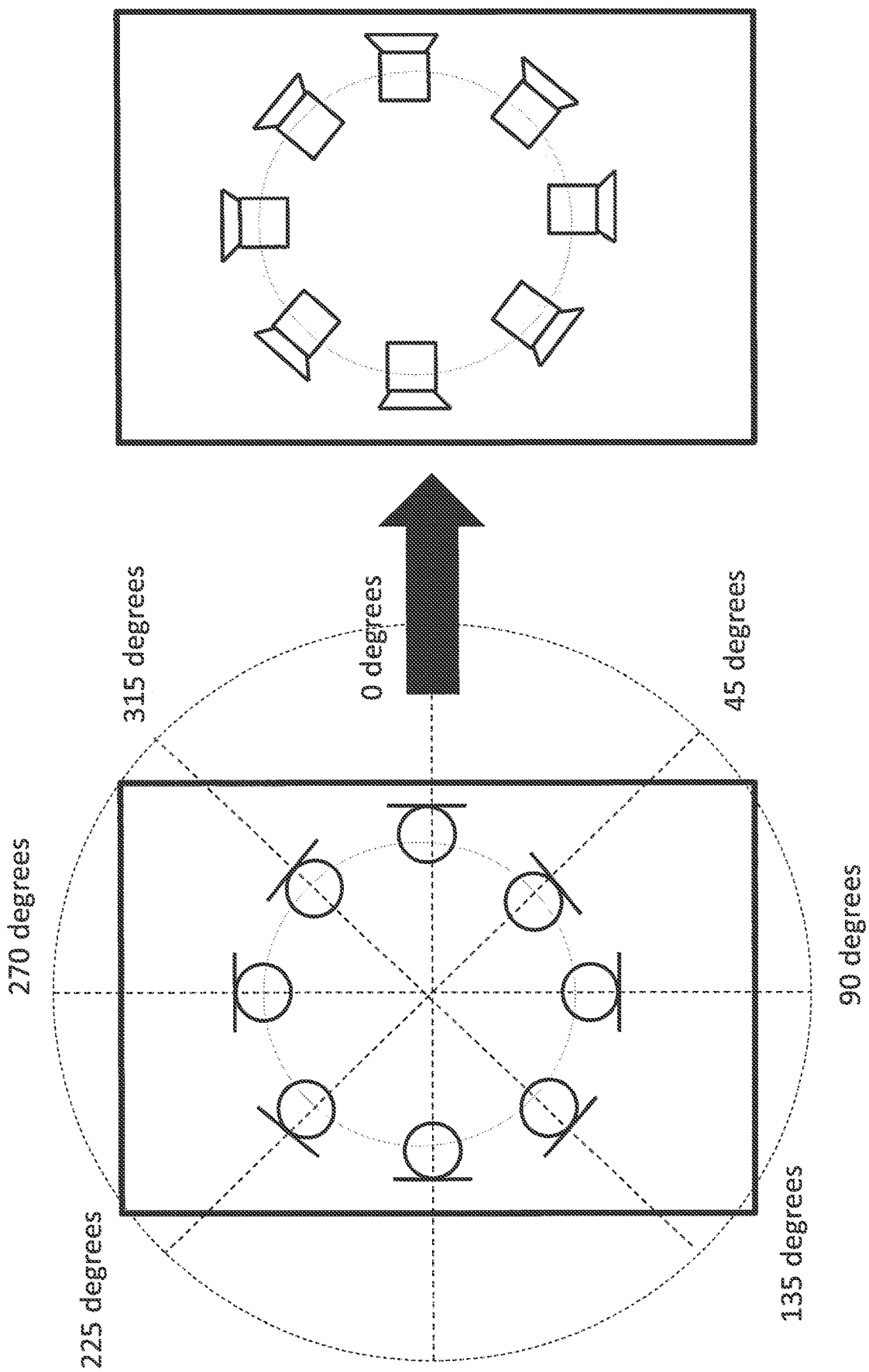
FIG. 24 shows schematically an example 8 microphone capture apparatus and an example 8 speaker playback apparatus configuration according to some embodiments.

Although in the example shown in FIG. 25 that there are three microphones it would be understood that in some embodiments there can be more than or fewer than three microphones and the microphones can be arranged or located on the apparatus in any suitable manner. For example FIG. 24 shows an eight microphone configuration wherein eight microphones are located on a surface of the apparatus at 45° angles around a defined circle. Thus for example a first microphone is located at 0°, a second microphone at 45°, a third microphone at 90°, a fourth microphone at 135°, a fifth microphone at 180°, a sixth microphone at 225°, and a seventh microphone phone at 270°, and an eighth microphone at 315°. The multi-microphone configuration may be located on non-flat surface on the apparatus or be spread into more than one surface/side of the apparatus.

Furthermore although as shown in FIG. 2, and FIGS. 24 and 25 that the microphones are part of the apparatus it would be understood that in some embodiments the microphones or microphone array is physically separate from the apparatus, for example the microphone array can be located on a headset (where optionally the headset can have an associated video camera) which wirelessly or otherwise passes the audio signals to the apparatus for processing. Furthermore although it would be understood that the audio signals are generated in real-time by the microphones, in other words that there is generated at least two audio signals, the at least two audio signals having a relative displacement between them, that in some embodiments these audio signals can be understood to be received from a storage device or memory. For example in some embodiments the 'generating' the audio signals can be from recorded and stored audio signals (for example in an off-line signal processing application).

Figure 3:
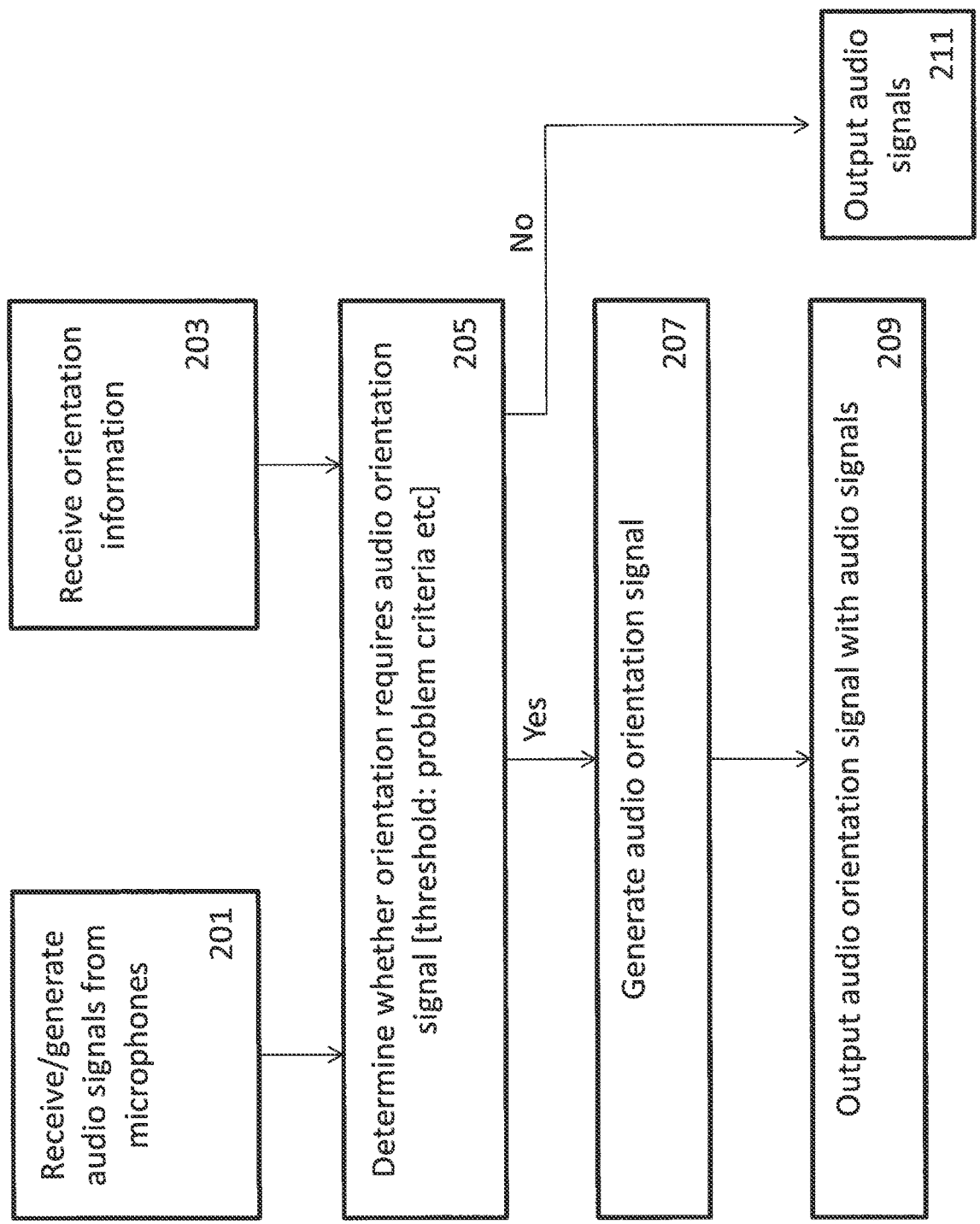
FIG. 3 shows schematically a flow diagram of the operation of the audio capture or recording apparatus shown in FIG. 2 according to some embodiments.
Figure 4:
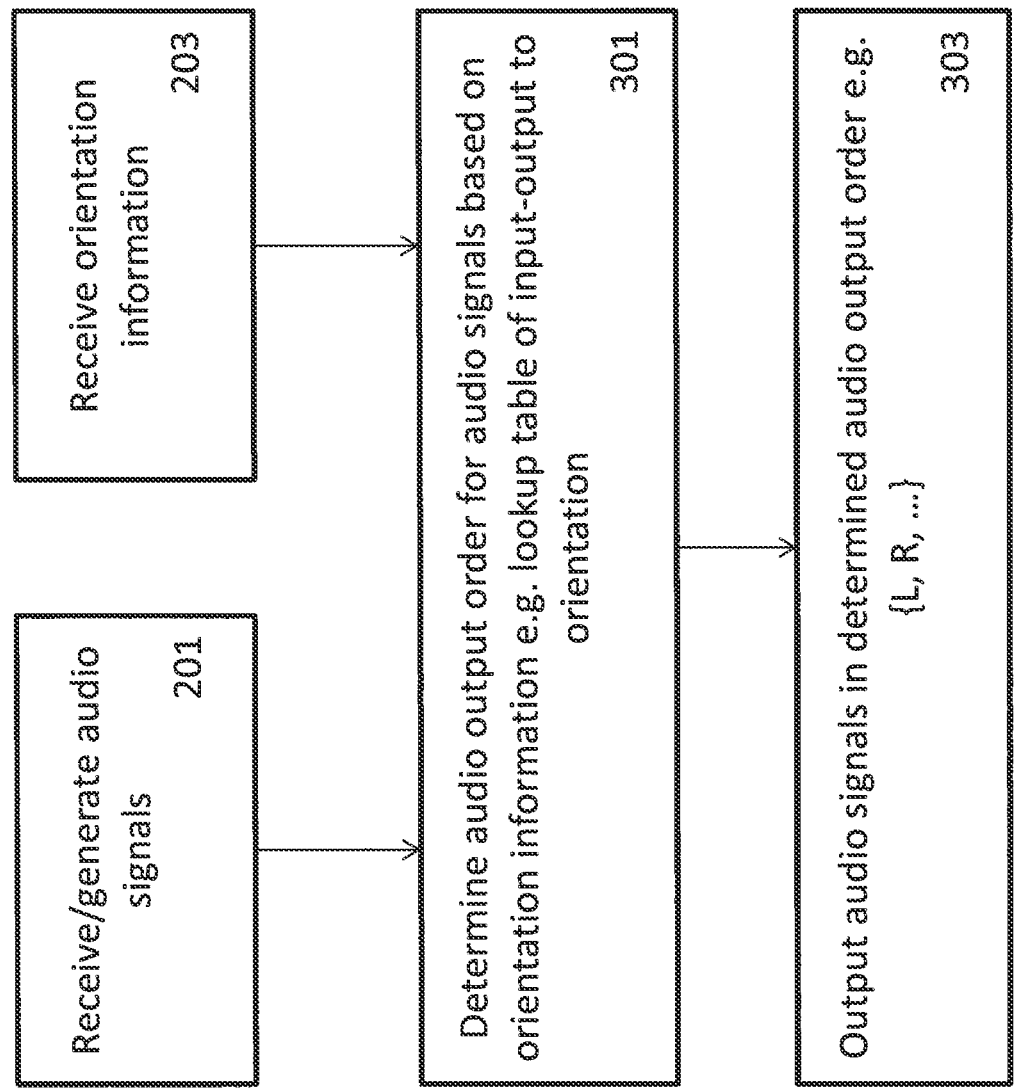
FIG. 4 shows schematically a further flow diagram of further operations of the audio capture or recording apparatus shown in FIG. 2 according to some embodiments.

The operation of receiving or generating the audio signals is shown in FIGS. 3 and 4 by step 201.

In some embodiments the apparatus comprises a gravity/orientation sensor 16. As described herein the gravity/orientation sensor 16 can be any suitable device or means for generating a signal and value which represents the apparatus orientation relative to a defined level. In the following examples the gravity/orientation sensor 16 defines a value or generates a value of the apparatus with respect to the vertical plane and the level.

However it would be understood that in some embodiments the gravity/orientation sensor 16 is configured to determine the orientation in more than one plane, in other words to determine a roll, pitch and yaw rotation value. Furthermore it would be understood that although the embodiments as described herein describe the use or implementation of a roll orientation about the horizontal plane similar methods could be applied to pitch and yaw rotations or a combination of at least two of these.

The operation of receiving or generating orientation information is shown in FIG. 3 and FIG. 4 by step 203.

The gravity/orientation sensor 16 can in some embodiments output the orientation information to the audio orientation signal generator 101 and microphone order generator 103.

In some embodiments the apparatus comprises an audio orientation signal generator 101. The audio orientation signal generator 101 is configured to receive the gravity/orientation sensor 16 output and determine firstly whether an audio orientation signal is to be generated and secondly the audio orientation signal to be output.

In some embodiments the audio orientation signal generator 101 is configured to receive the orientation information.

The audio orientation signal generator is configured to determine an audio orientation signal. In some embodiments this is generated whatever the orientation value is. However in some embodiments the determination of audio orientation signal (in other words whether an orientation signal is to be output to the receiving or playback apparatus) is based on the audio orientation information. For example in some embodiments the audio orientation signal generator 101 can be configured to generate and transmit a signal to the receiving or playback apparatus comprising the orientation value of the audio capture where the orientation of the capture is greater than a determined threshold from a determined 'default' audio orientation. The 'default' orientation can be any suitable audio orientation though typically it is horizontal orientation. In some embodiments the threshold for determining whether to change the audio orientation of capture (i.e. signal the audio orientation value) can be 45 degrees from the default orientation, this threshold determining whether the audio capture is considered at the receiver as orientated horizontally or vertically. Suitable hysteresis should be applied to avoid audio being oscillating between two orientations at the receiving device. In some embodiments the threshold for determining whether to signal the audio orientation value can be more or less than 45 degrees. It would be understood that the audio orientation is also known as a capture orientation or an audio capture orientation. It would be further understood that in some embodiments determining the capture orientation may comprise determining an audio capture orientation based on device orientation and information concerning microphone configuration in a capture apparatus. In other words that the audio orientation signal generator can be configured to receive information concerning the microphone configuration, such as the number of microphones, the position of the microphones and a relative positioning of the microphones and/or the device on which the microphones are attached. In some embodiments the information can further include the capture directionality of the microphone (is the microphone a directional or omnidirectional microphone) and where the microphone is directional the orientation of the capture directionality.

The operation of determining whether the determined orientation requires an audio orientation signal is shown in FIG. 3 by step 205.

The audio orientation signal generator 101 can then in some embodiments be configured to generate a suitable audio orientation signal. The audio orientation signal in some embodiments comprises an indicator of the orientation angle. For example in some embodiments the audio orientation signal comprises a quantised version of the audio orientation signal. The audio orientation signal can for example comprise the indication that the audio capture is orientated either horizontally or vertically in other words the audio orientation signal is the orientation value of the recording with 90° orientation quantisation but having no information on which side is which in the vertical or horizontal plane. In such embodiments the audio orientation signal can require only one bit to signal this information but the capturing and rendering devices must be aware of the audio output order i.e. which signal is sent first in horizontal capture (audio output order "left, right" or "right, left") and in vertical capture (audio output order: "top, bottom" or "bottom, top"). "Audio output order" means the order (in the bit-stream) in which the audio outputs are sent from the capturing device to the receiving device.

In some embodiments the audio orientation signal can for example comprise the indication that the audio capture is orientated either vertically, vertically rotated with 180 degrees, horizontally, horizontally rotated with 180 degrees. In other words the audio orientation signal is the orientation value of the recording or capture with quartile quantisation (or outputting a value of 0°, 90°, 180°, or 270° orientation which can be signalled using 2 bits. In this case, the audio output order can be signalled by the audio orientation signal itself. In some embodiments more accurate quantization may be used, e.g. 0°, 45°, 90°, 135°, 180° . . . 315° which can be signalled using 3 bits, However it would be understood that the audio orientation information can be in any suitable format or form or quantisation level. In some embodiments the signalling of the audio orientation information is provided as metadata with the audio signals. For example in non-real time recordings where the audio signals are to be received/downloaded from external sources and the orientation data is provided in metadata.

In some embodiments the signaling of audio orientation can be performed by embedding the orientation value within any suitable message or protocol and transmitting this to the receiving or playback device. In some embodiments the orientation value can be embedded within a real time protocol (RTP) header extension. For example the signaling of the audio orientation can be carried out over an internet protocol (IP) connection by using the RTP header extension in a manner as explained in IETF RFC 5285 "A General Mechanism for RTP Header Extensions". An example RTP header extension, with one extension element, some padding, and including the required RTP fields is given below. This supports sending the audio orientation signaling (AOS) data (specifying the orientation of audio capture e.g. in degrees) with 8 bits for each RTP frame. This should be enough to support any practical granularity for audio orientation.

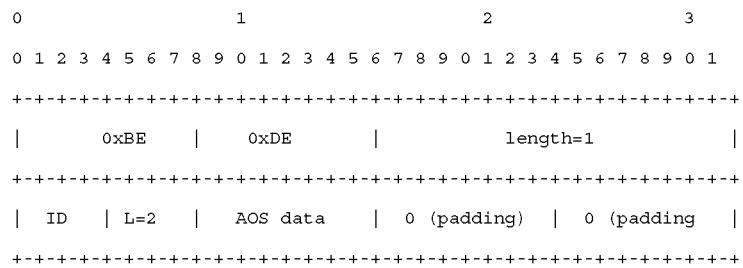

In some embodiments the AOS data is sent only after determining a change in audio orientation to avoid adding too much overhead into the overall transmission data.

However it would be understood that in some embodiments the generation and/or transmission of AOS data is a regular or continuous operation.

In some embodiments an extended AOS data, containing not only information of the orientation of audio capture but also configuration information, is transmitted at the session setup negotiation stage. In IP-based services such setup negotiation can be performed using Session Description Protocol (SDP) and the layout or configuration of the microphones (Le, their number and positions in the capture or sending device and any other relevant configuration information) is detailed to the receiver. In such embodiments, solely based on device orientation signaling, the playback or receiver device is made aware of not only the orientation of sending device but also of the orientation of the audio capture in the sending device, and therefore sending any further AOS data after the setup may not be needed In some embodiments any further capture device orientation (or at least changes in the orientation) can then be generated and transmitted from the capture or sender device to the playback or receiving device. It would be understood that the SDP embodiments attempt to reduce the signaling overhead, but require definition of "common language" in other words the introduction of a new SDP parameter on how the microphone layout is described by the sending device and transferred to the receiving device.

The operation of generating the audio orientation signal is shown in FIG. 3 by step 207.

Furthermore the audio orientation signal generator can then be configured to output the audio orientation signal (AOS data) which is output at the same time that the microphone order generator 103 or capture apparatus in general outputs the audio signals (or in some embodiments the microphones output the audio signals themselves).

The operation of outputting the audio orientation signal with audio signals is shown in FIG. 3 by step 209.

Where the audio orientation signal generator 101 determines that no orientation signal is to be output then the audio orientation signal generator is configured not to output an audio orientation signal. Thus in some embodiments the recording device or apparatus outputs only the audio signals.

The operation of outputting only the audio signals is shown in FIG. 3 by step 211.

In some embodiments the determination of whether an audio orientation signal is to be generated or transmitted can be performed not only on the orientation of the capture or recording device but furthermore on the microphone configuration of the capture or recording device. For example it would be understood that the orientation of the capture or recording apparatus may not be problematic for any orientation of the capture or recording apparatus providing certain criteria are met with respect to the configuration of the capture apparatus, the playback apparatus (including the orientation of the playback apparatus), and the manner that the audio signals are transmitted.

Thus for example in some embodiments the audio orientation signal generator 101 is configured to determine whether given information concerning capture apparatus microphone configuration (for example the microphone number and location of the microphones) that the orientation of the device could be problematic in terms of audio signal playback.

In some embodiments the audio orientation signal generator 101 is configured to assume that the output device speaker configuration is the same as the current recording device however as described herein in some embodiments the audio orientation signal generator 101 can receive information from the playback device concerning the speaker configuration (and in some embodiments concerning the orientation or the playback apparatus) and determine whether or not the microphone configurations, speaker configurations, and orientation of each could be problematic.

For example in some embodiments the audio orientation signal generator 101 can use a look up table to determine whether an orientation signal is to be generated and transmitted.

In some embodiments the apparatus comprises a microphone order generator 103 or audio output orderer (or suitable means for generating an audio output order). The microphone order generator 103 is configured to receive the inputs from the microphones, such as shown in FIG. 25 by microphones $11_1$ to $11_N$ and further receive the input from the gravity/orientation sensor 16 indicating the orientation of the apparatus. In some embodiments the microphone order generator 103 can be configured to determine a specific audio output order or inform the receiving or playback apparatus of a specific audio output order.

In the following examples the audio output order is leftmost channel, rightmost channel and then other channels, however any suitable audio output order can be implemented. For example a rightmost channel to leftmost channel, an upmost channel to downmost channel, or downmost channel to upmost channel.

Furthermore the audio output order can be other than a linear ordering, for example in some embodiments the audio output order can be a cyclical order starting from a first orientation (leftmost channel) and then ordering the microphone channels as they occur clockwise (or anticlockwise).

In some embodiments the audio output order can be for more than one dimension (and so to enable pitch and yaw rotations to be considered).

In some embodiments the microphone order generator 103 is therefore configured to determine the audio output order based on the knowledge of the locations of the microphones and the orientation sensor input.

In an example 3 microphone configuration with an apparatus in an initial orientation (0 degrees) with a first microphone L $11_{11}$ located to the top left of the apparatus, a second microphone R $11_{12}$ located to the top right of the apparatus and a third microphone L'$11_{13}$ located at the bottom left of the apparatus. In the following description top and bottom are with reference to a normal interpretation of relative positions or elements being at a highest gravitational potential and lowest gravitational potential respectively. However it would be understood that in some embodiments the top and bottom refer to relative opposite positions or elements in any suitable vector. Thus similarly in some embodiments top and bottom can be referred to as up and down.

Furthermore in the following examples where there is the choice between two microphones, for example there are two microphones located at the same or similar horizontal distances from a third microphone, then the one with the smallest vertical distance from the third microphone should be put first (of the two) in the audio output order. In other words in this example where possible the first microphone is selected as being the furthest left microphone over the others and the second microphone is selected as being the furthest right microphone over the third microphone. In addition, the audio output order is to be made based on the orientation (of the highest separation) as indicated by AOS i.e. in the case of vertical capture it will be based on which microphone is located upmost and which is located downmost on the device (instead of leftmost and rightmost). Also this is shown in the following examples. It would be understood that any suitable selection order can be used.

Thus for an initial 0 degrees orientation the microphone order generator can be configured to generate an audio output order of L, R, L'.

A rotation of 90 degrees clockwise causes the microphone order generator to generate an audio output order of L', L, R.

A further rotation of 90 degrees clockwise, in other words a 180 degrees from the initial orientation causes the microphone order generator to generate an audio output order of R, L, L'.

Furthermore a further rotation of 90 degrees clockwise, in other words a 270 degrees rotation clockwise from the initial orientation causes the microphone order generator to generate an audio output order of L, L', R.

In other words the order that a microphone audio signal occurs within the ordering is based on the orientation value of the apparatus. In some embodiments this ordering can be determined based on a look up table of input orientation sensor values.

The operation of determining an audio output order based on the orientation information is shown in FIG. 4 by step 301.

Furthermore in some embodiments the microphone order generator 103 is configured to output the audio signals in the determined audio output order.

In other words the microphone audio signal associated with the first element on the ordering is output as the first output channel $105_1$, the microphone audio signal associated with the second element on the ordering is output as the second output channel $105_2$ and so on.

It would be understood that in some embodiments there can be more or fewer output channels than there are microphone audio signals.

The operation of outputting the audio signals in a determined orientation order is shown in FIG. 4 by step 303.

In some embodiments the microphone order generator 103 outputs the microphone audio signals in the originally received order and instead of changing the audio output order is configured to output the audio output order as a message or signal it to the receiver or playback apparatus.

Furthermore in some embodiments there is no microphone order generator within the recording or capture apparatus. However in such embodiments the operation of the microphone order generator can be achieved within the receiving or playback apparatus having received or determined signal indicating the orientation of the capture apparatus and also having received the microphone configuration information, for example in a SDP message as extended AOS data, like explained earlier.

Example audio output ordering and audio orientation signal generation situations can be shown with respect to FIGS. 8 to 11 where an example 3 microphone configuration for the capture or recording apparatus is shown and an example 3 speaker configuration for the playback or rendering apparatus is shown for orientation steps of 90°.

In the example 3 microphone configuration the initial orientation (0 degrees) is in portrait orientation with a first microphone L $11_{11}$ located to the top left of the apparatus, a second microphone R $11_{12}$ located to the top right of the apparatus and a third microphone L' $11_{13}$ located at the bottom left of the apparatus.

Similarly in the example 3 speaker configuration the initial orientation (0 degrees) is in portrait orientation with a first speaker $33_{11}$ located to the top left of the apparatus, a second speaker $33_{12}$ located to the top right of the apparatus and a third speaker $33_{13}$ located at the bottom left of the apparatus.

Figure 8:
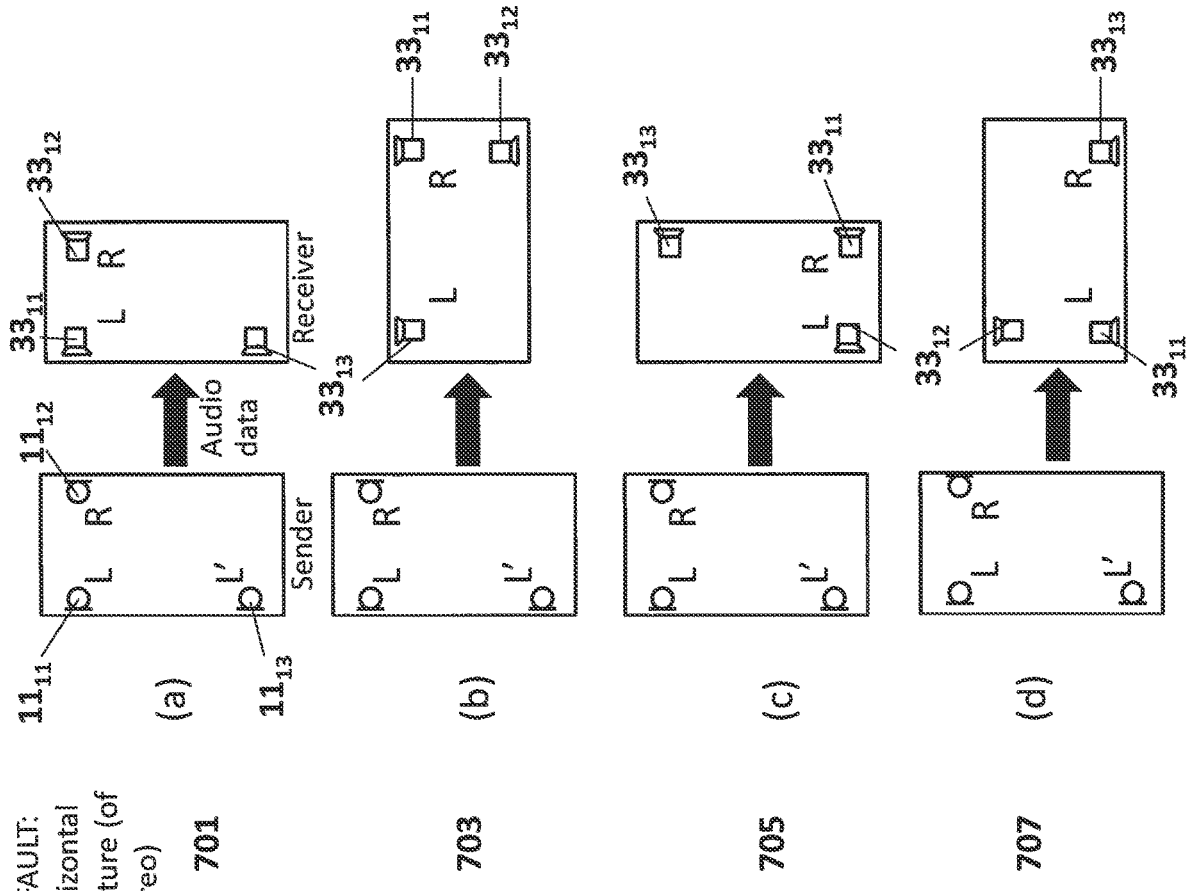
FIGS. 8 to 11 show example 3 microphone capture apparatus and 3 speaker playback apparatus orientation combinations for 90 degree rotations according to some embodiments.

FIG. 8 for example shows the four situations where the recording or capture apparatus (sender apparatus) is in initial orientation and the playback or rendering apparatus (receiver apparatus) is rotated with 90 degree granularity (where the rotation is measured clockwise in degrees). The microphone order generator can in these four situations be configured to generate an audio output order of L, R, L'. In these embodiments the audio outputs are correctly ordered or labelled such that the left(most) channel audio signal is that generated by the first microphone $11_{11}$ L and the right(most) channel audio signal is that generated by the second microphone $11_{12}$ R. It would be understood that in some embodiments the left(most) channel audio signal can be that generated by the third microphone $11_{13}$ L'. FIG. 8 shows that despite the rotation of the playback apparatus there is no problem in playback and as such in some embodiments there is no need to send AOS data.

Figure 9:
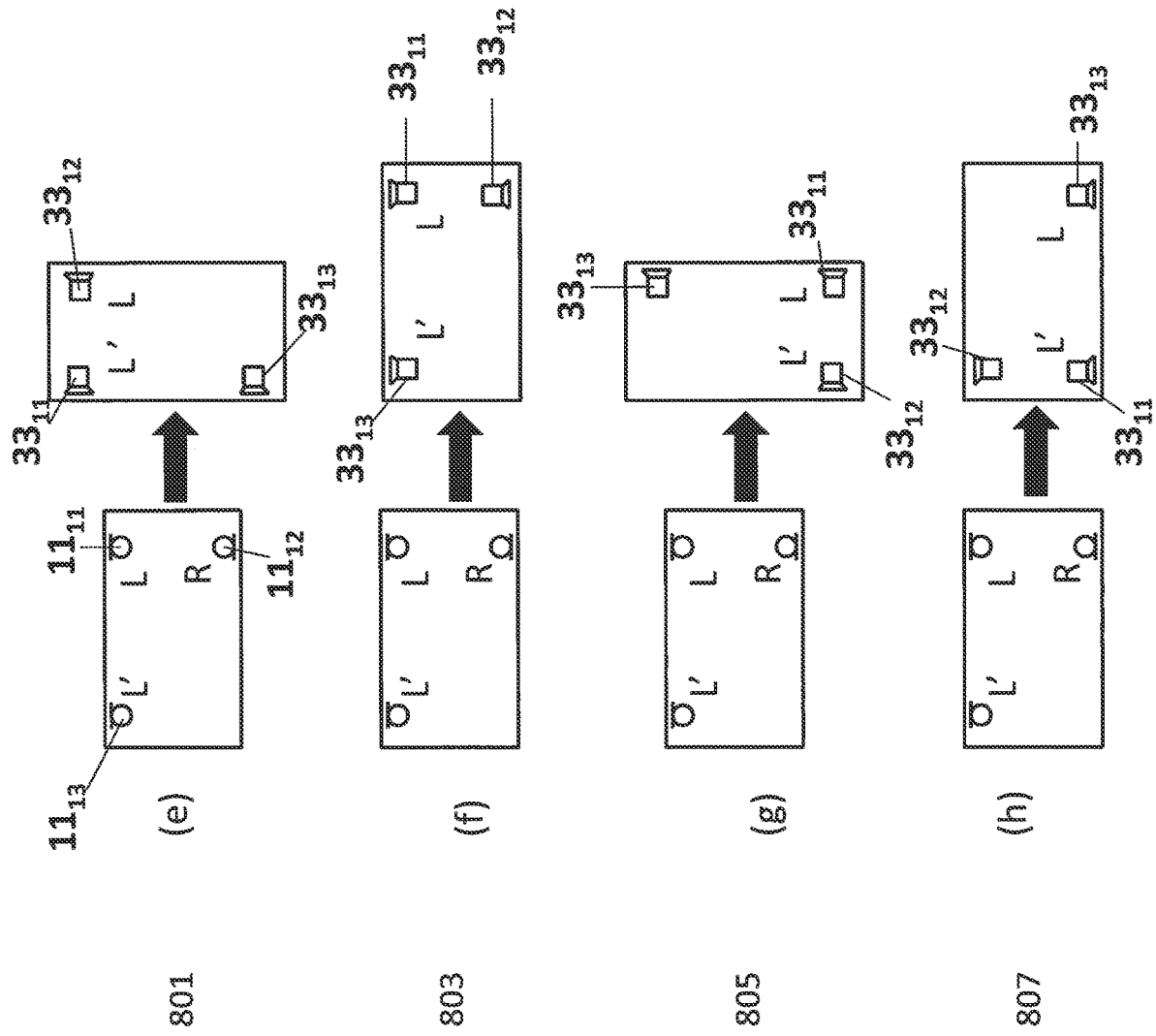

FIG. 9 shows the four situations where the recording or capture apparatus (sender apparatus) is 90 degrees clockwise from the initial orientation and the playback or rendering apparatus (receiver apparatus) is rotated with 90 degree granularity (where the rotation is measured clockwise in degrees). The microphone order generator can in these four situations be configured to generate an audio output order of L', L, R. In these embodiments the audio outputs are correctly ordered or labelled such that the left(most) channel audio signal is that generated by the third microphone $11_{13}$ L' and the right(most) channel audio signal is that generated by the first microphone $11_{11}$ L. It would be understood that in some embodiments the right(most) channel audio signal can be that generated by the second microphone $11_{12}$ R. FIG. 9 shows that despite the rotation of the capture apparatus and playback apparatus there is no problem and as such in some embodiments there is no need to send AOS data (provided the audio outputs are correctly ordered or labelled).

Figure 10:
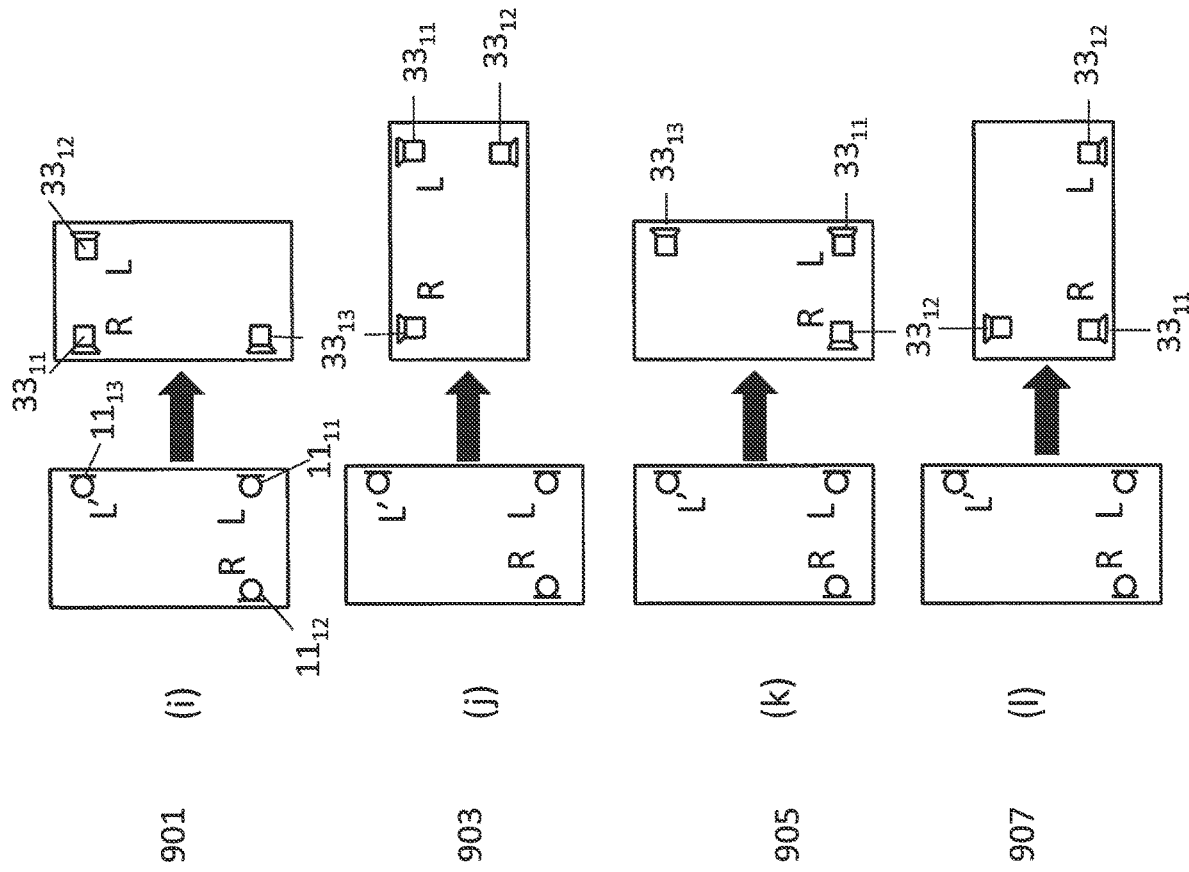

FIG. 10 shows the four situations where the recording or capture apparatus (sender apparatus) is 180 degrees clockwise from the initial orientation and the playback or rendering apparatus (receiver apparatus) is rotated with 90 degree granularity (where the rotation is measured clockwise in degrees). The microphone order generator can in these four situations be configured to generate an audio output order of R, L, L'. In these embodiments the audio outputs are correctly ordered or labelled such that the left(most) channel audio signal is that generated by the second microphone $11_{12}$ R and the right(most) channel audio signal is that generated by the first microphone $11_{11}$ L. It would be understood that in some embodiments the right (most) channel audio signal can be that generated by the third microphone $11_{13}$ L'. FIG. 10 shows that despite the rotation of the capture apparatus and playback apparatus there is no problem and as such in some embodiments there is no need to send AOS data (provided the audio outputs are correctly ordered or labelled).

Figure 11:
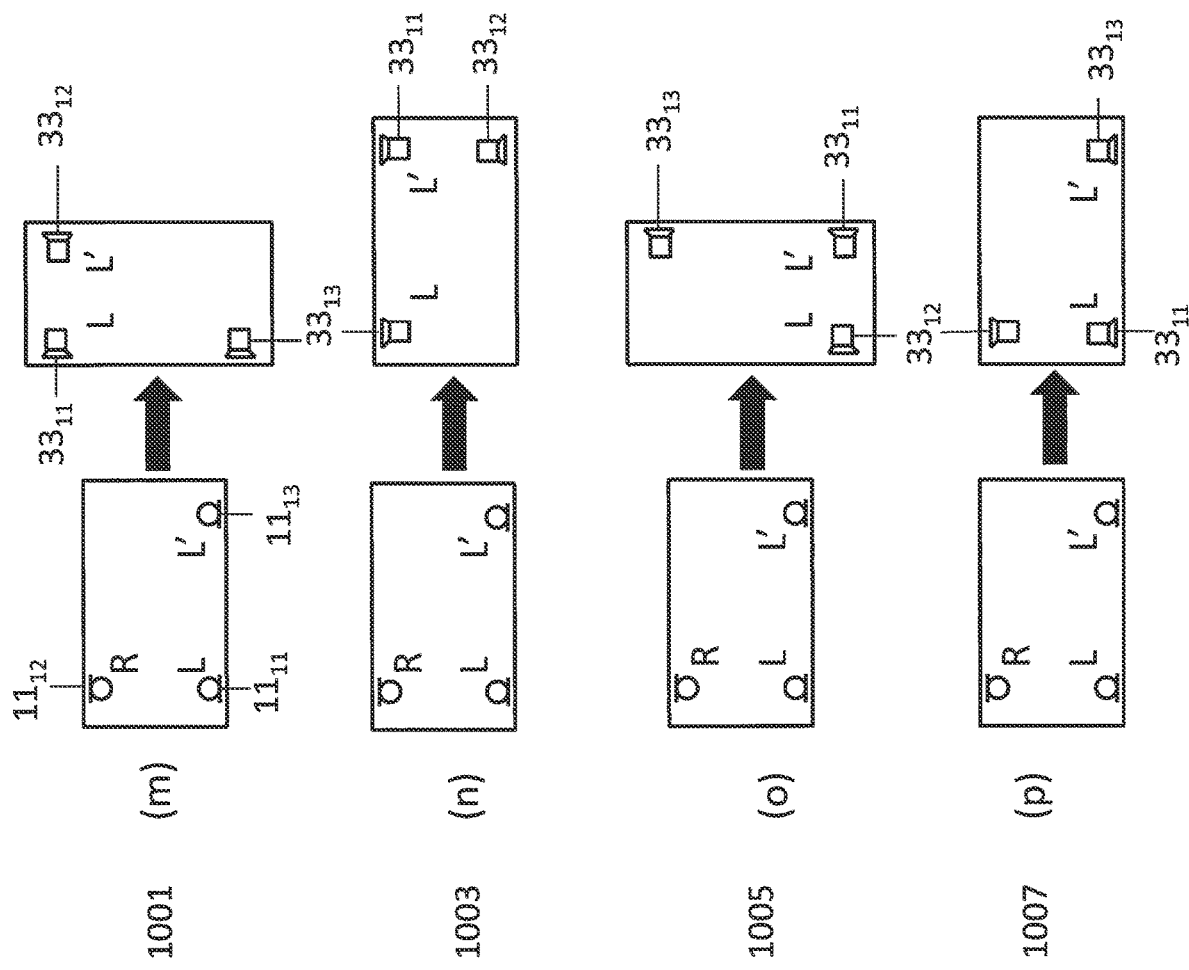

FIG. 11 shows the four situations where the recording or capture apparatus (sender apparatus) is 270 degrees clockwise from the initial orientation and the playback or rendering apparatus (receiver apparatus) is rotated with 90 degree granularity (where the rotation is measured clockwise in degrees). The microphone order generator can in these four situations be configured to generate an audio output order of L, L', R. In these embodiments the audio outputs are correctly ordered or labelled such that the left(most) channel audio signal is that generated by the first microphone $11_{11}$ L and the right(most) channel audio signal is that generated by the third microphone $11_{13}$ L'. It would be understood that in some embodiments the left(most) channel audio signal can be that generated by the second microphone $11_{12}$ R. FIG. 11 shows that despite the rotation of the capture apparatus and playback apparatus there is no problem and as such in some embodiments there is no need to send AOS data (provided the audio outputs are correctly ordered or labelled).

A further example audio output ordering and audio orientation signal generation situations can be shown with respect to FIGS. 12 to 15 where an example 2 microphone configuration for the capture or recording apparatus is shown and an example 2 speaker configuration for the playback or rendering apparatus is shown for orientation steps of 90°.

In the example 2 microphone configuration the initial orientation (0 degrees) is in portrait orientation with a first microphone L $11_{11}$ located to the top left of the apparatus, and a second microphone R $11_{12}$ located to the top right of the apparatus. In other words similar to the example 3 microphone configuration shown in FIGS. 8 to 11 but with the third microphone removed or disabled or switched off.

Similarly in the example 2 speaker configuration the initial orientation (0 degrees) is in portrait orientation with a first speaker $33_{11}$ located to the top left of the apparatus and a second speaker $33_{12}$ located to the top right of the apparatus. In other words similar to the example 3 speaker configuration shown in FIGS. 8 to 11 but with the third speaker $33_{13}$ removed, disabled or switched off.

Figure 12:
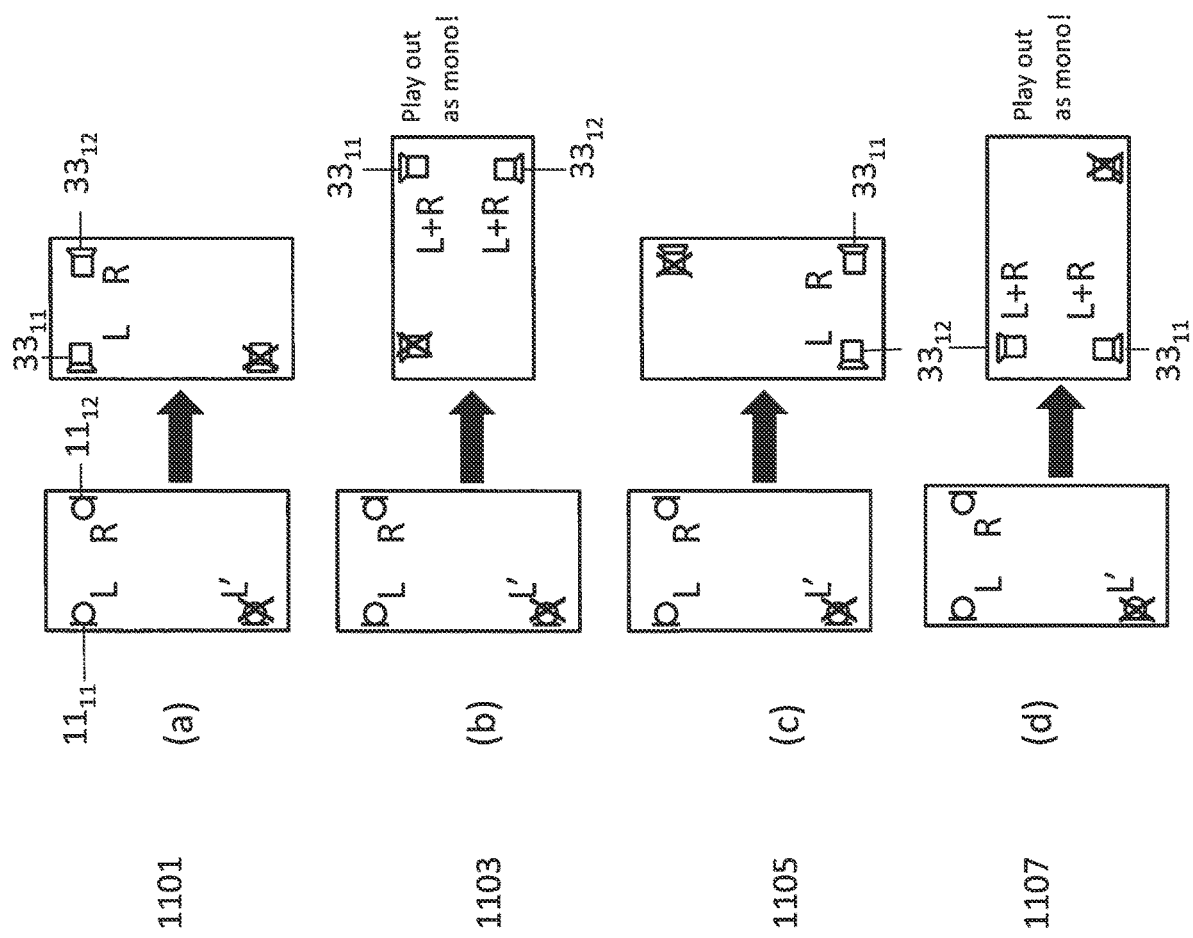
FIGS. 12 to 15 show example 2 microphone capture apparatus and 2 speaker playback apparatus orientation combinations for 90 degree rotations according to some embodiments.

FIG. 12 for example shows the four situations where the recording or capture apparatus (sender apparatus) is in initial orientation and the playback or rendering apparatus (receiver apparatus) is rotated with 90 degree granularity (where the rotation is measured clockwise in degrees). The microphone order generator can in these four situations be configured to generate an audio output order of L, R. In these embodiments the audio outputs are correctly ordered or labelled such that the left(most) channel audio signal is that generated by the first microphone $11_{11}$ L and the right(most) channel audio signal is that generated by the second microphone $11_{12}$ R. FIG. 12 shows that there is no problem in playback caused by the capture apparatus and as such in some embodiments there is no need to send AOS data.

Figure 13:
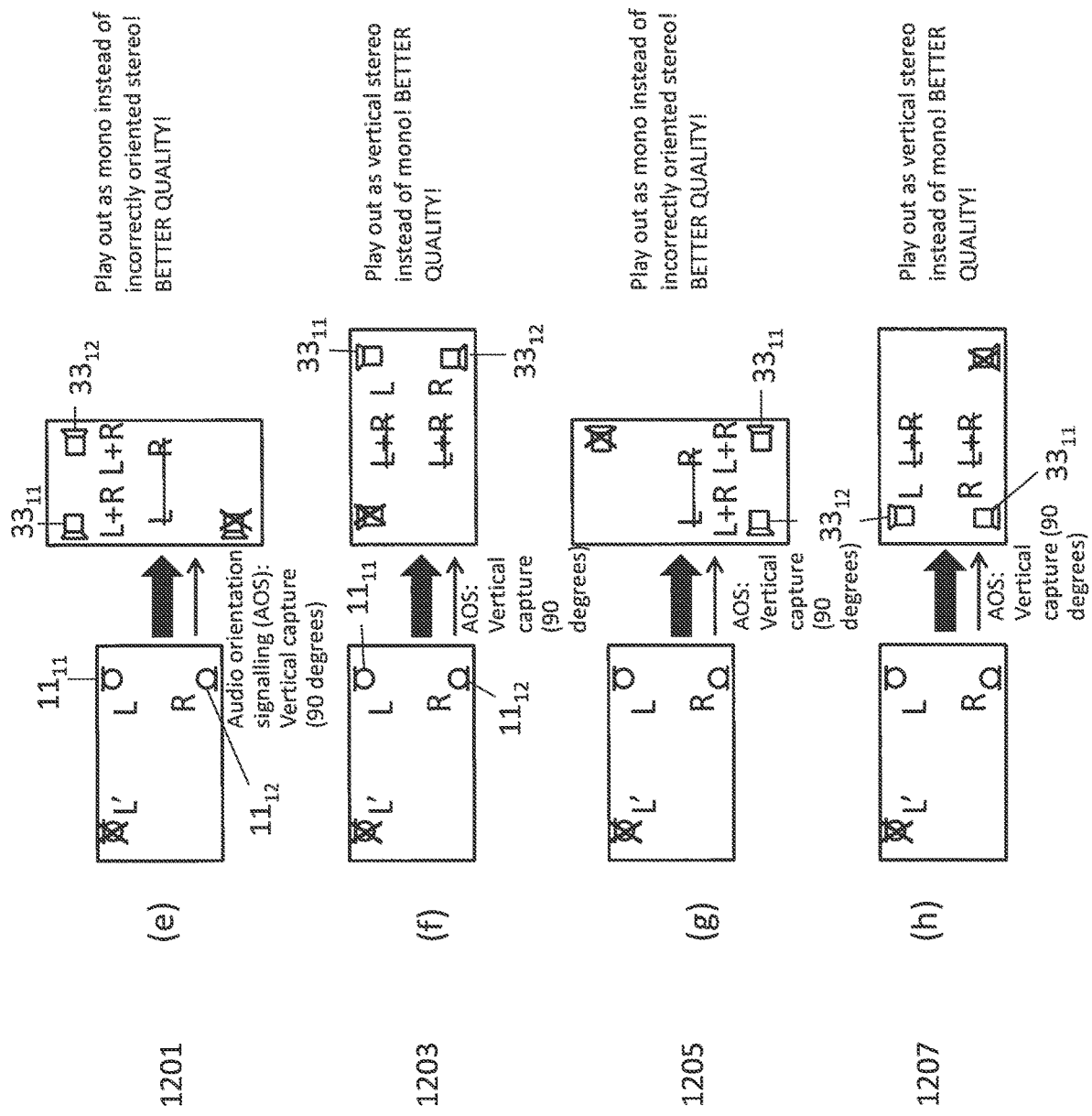

FIG. 13 shows the four situations where the recording or capture apparatus (sender apparatus) is 90 degrees clockwise from the initial orientation and the playback or rendering apparatus (receiver apparatus) is rotated with 90 degree granularity (where the rotation is measured clockwise in degrees). The microphone order generator can in these four situations be configured to generate an audio output order of L, R. In these embodiments the audio outputs are ordered or labelled such that the left(most) channel audio signal is that generated by the first microphone $11_{11}$ L and the right(most) channel audio signal is that generated by the second microphone $11_{12}$ R. However the orientation of the recording or capture apparatus is such that there is no or very little horizontal separation between the first microphone $11_{11}$ and second microphone $11_{12}$ and therefore the horizontal stereo capture effect is minimal (below a certain threshold) or there is none. FIG. 13 therefore shows that the orientation of the capture apparatus can cause a problem and as such AOS data is to be sent to permit the receiving apparatus or playback apparatus to allow for the lack of horizontal separation (or vertical capture). In some embodiments, the audio output order is to be made based on the orientation indicated by AOS. In other words for the example shown in FIG. 13 the audio output order can be based on which microphone is located upmost and which is located downmost on the device (instead of leftmost and rightmost).

Figure 14:
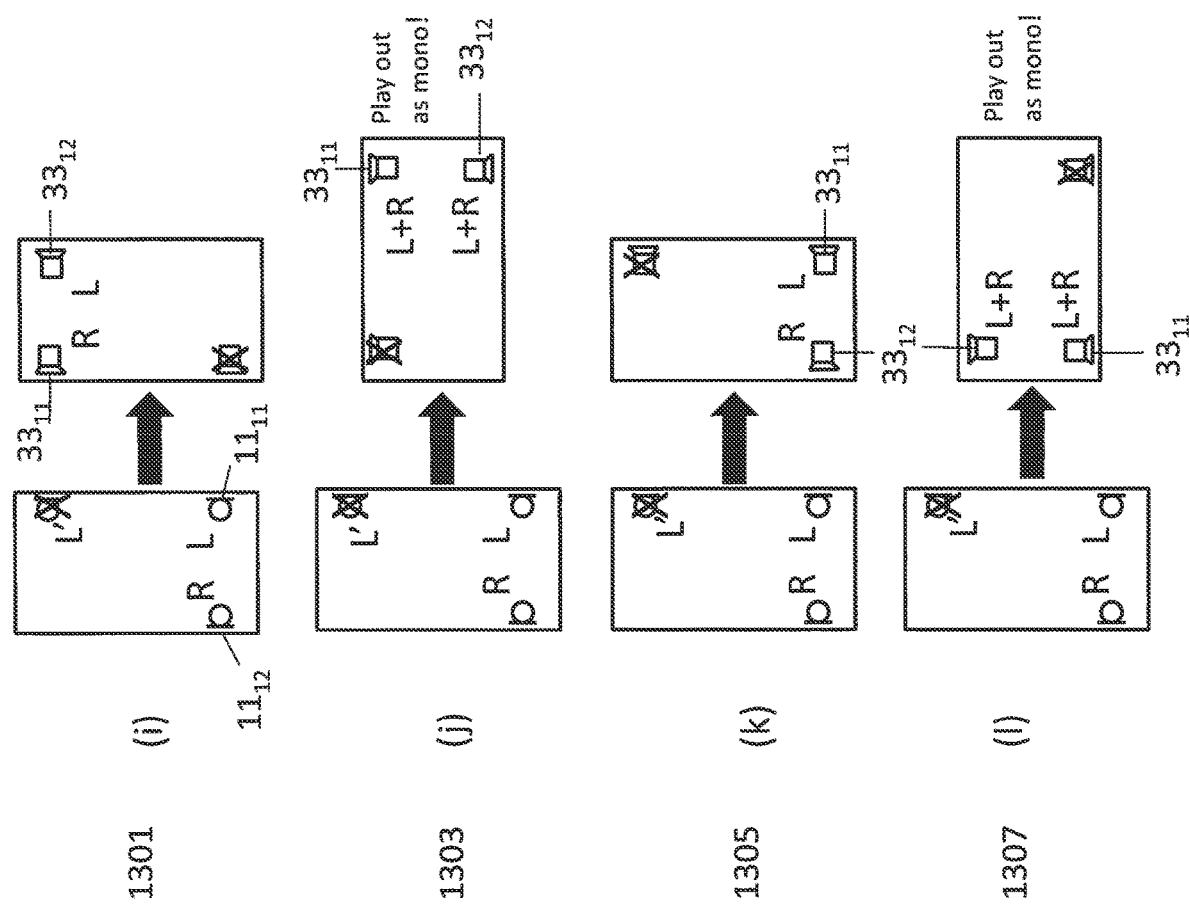

FIG. 14 shows the four situations where the recording or capture apparatus (sender apparatus) is 180 degrees clockwise from the initial orientation and the playback or rendering apparatus (receiver apparatus) is rotated with 90 degree granularity (where the rotation is measured clockwise in degrees). The microphone order generator can in these four situations be configured to generate an audio output order of R, L. In these embodiments the audio outputs are correctly ordered or labelled such that the left(most) channel audio signal is that generated by the second microphone $11_{12}$ R and the right(most) channel audio signal is that generated by the first microphone $11_{11}$ L. FIG. 14 shows that there is no problem in playback caused by the capture apparatus and as such in some embodiments there is no need to send AOS data (provided the audio outputs are correctly ordered or labelled).

Figure 15:
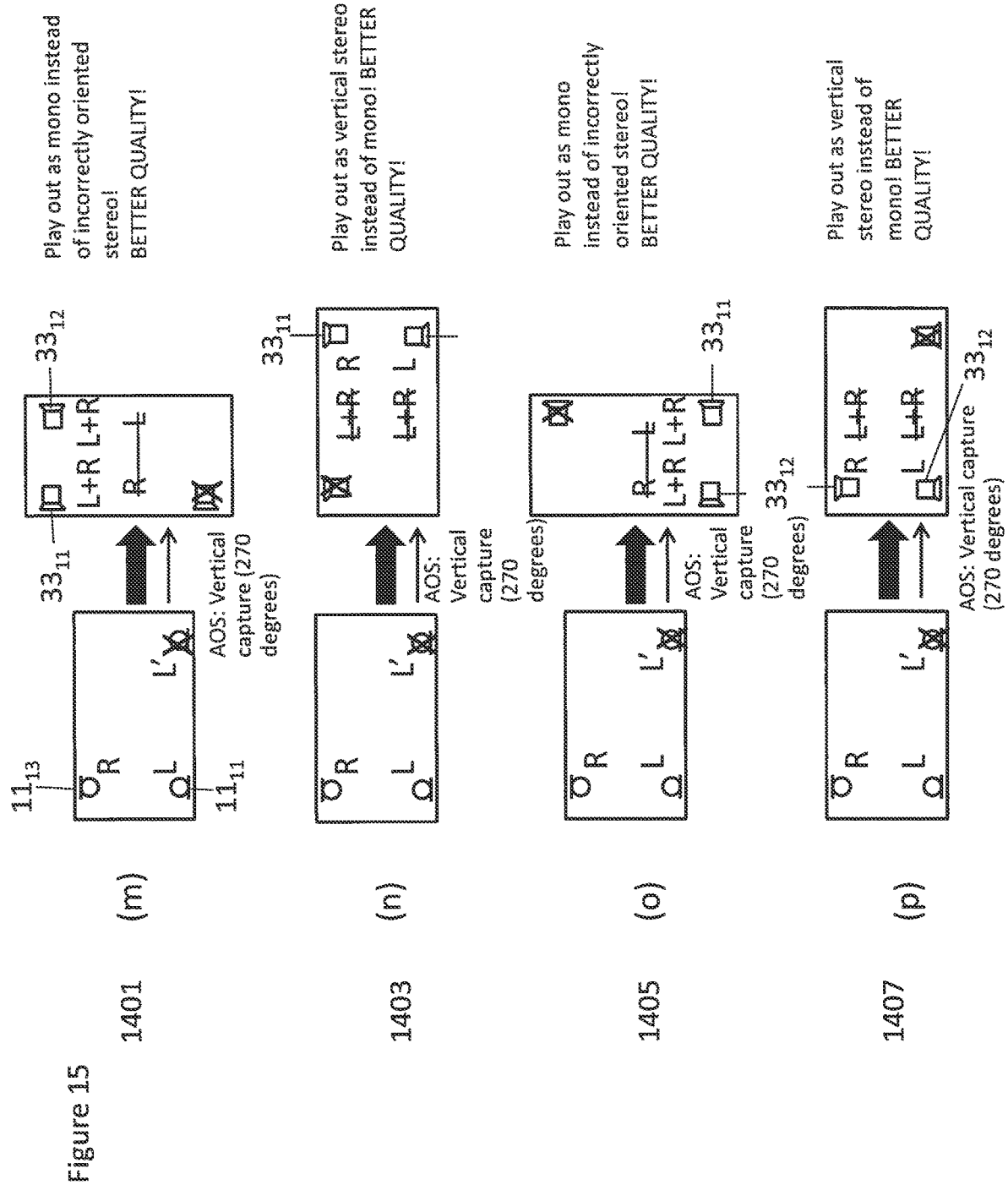

FIG. 15 shows the four situations where the recording or capture apparatus (sender apparatus) is 270 degrees clockwise from the initial orientation and the playback or rendering apparatus (receiver apparatus) is rotated with 90 degree granularity (where the rotation is measured clockwise in degrees). The microphone order generator can in these four situations be configured to generate an audio output order of R, L. In these embodiments the audio outputs are ordered or labelled such that the left(most) channel audio signal is that generated by the second microphone $11_{12}$ R and the right(most) channel audio signal is that generated by the first microphone $11_{11}$ L. However the orientation of the recording or capture apparatus is such that there is no or very little horizontal separation between the first microphone $11_{11}$ and second microphone $11_{12}$ and therefore the horizontal stereo capture effect is minimal (below a certain threshold) or there is none. FIG. 15 therefore shows that the orientation of the capture apparatus can cause a problem and as such AOS data is to be sent to permit the receiving apparatus or playback apparatus to allow for the lack of horizontal separation (or vertical capture). In some embodiments, the audio output order is to be made based on the orientation indicated by AOS. In other words for the example shown in FIG. 15, the audio output order can be based on which microphone is located upmost and which is located downmost on the device (instead of leftmost and rightmost).

A further example audio output ordering and audio orientation signal generation situations can be shown with respect to FIGS. 16 to 19 where an example 2 microphone configuration for the capture or recording apparatus is shown and an example 3 speaker configuration for the playback or rendering apparatus is shown for orientation steps of 90°.

In the example 2 microphone configuration the initial orientation (0 degrees) is in portrait orientation with a first microphone L $11_{11}$ located to the top left of the apparatus, and a second microphone R $11_{12}$ located to the top right of the apparatus. In other words similar to the example 3 microphone configuration shown in FIGS. 8 to 11 but with the third microphone removed or disabled or switched off.

The example 3 speaker configuration (which is similar to the examples shown in FIGS. 8 to 11) the initial orientation (0 degrees) is in portrait orientation with a first speaker $33_{11}$ located to the top left of the apparatus, a second speaker $33_{12}$ located to the top right of the apparatus and a third speaker $33_{13}$ located at the bottom left of the apparatus.

Figure 16:
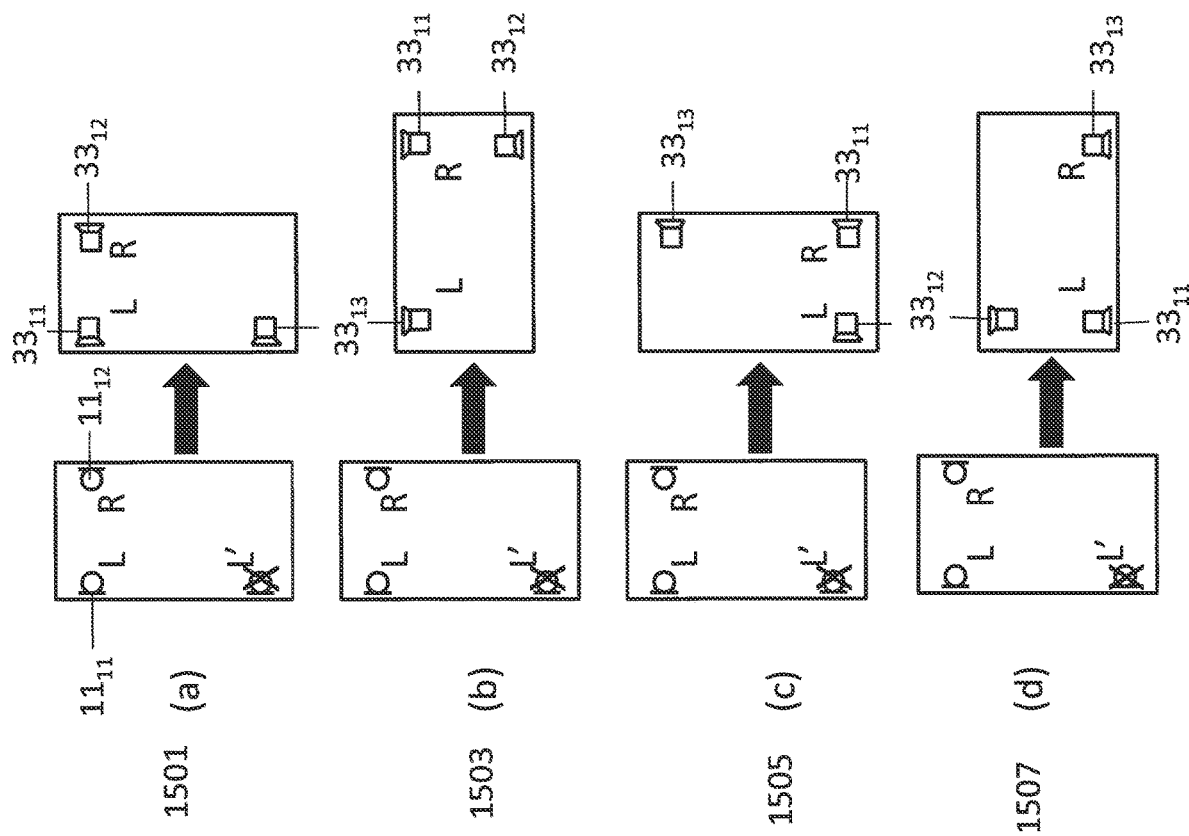
FIGS. 16 to 19 show example 2 microphone capture apparatus and 3 speaker playback apparatus orientation combinations for 90 degree rotations according to some embodiments.

FIG. 16 for example shows the four situations where the recording or capture apparatus (sender apparatus) is in initial orientation and the playback or rendering apparatus (receiver apparatus) is rotated with 90 degree granularity (where the rotation is measured clockwise in degrees). The microphone order generator can in these four situations be configured to generate an audio output order of L, R. In these embodiments the audio outputs are correctly ordered or labelled such that the left(most) channel audio signal is that generated by the first microphone $11_{11}$ L and the right(most) channel audio signal is that generated by the second microphone $11_{12}$ R. FIG. 12 shows that there is no problem in playback caused by the capture apparatus and as such in some embodiments there is no need to send AOS data.

Figure 17:
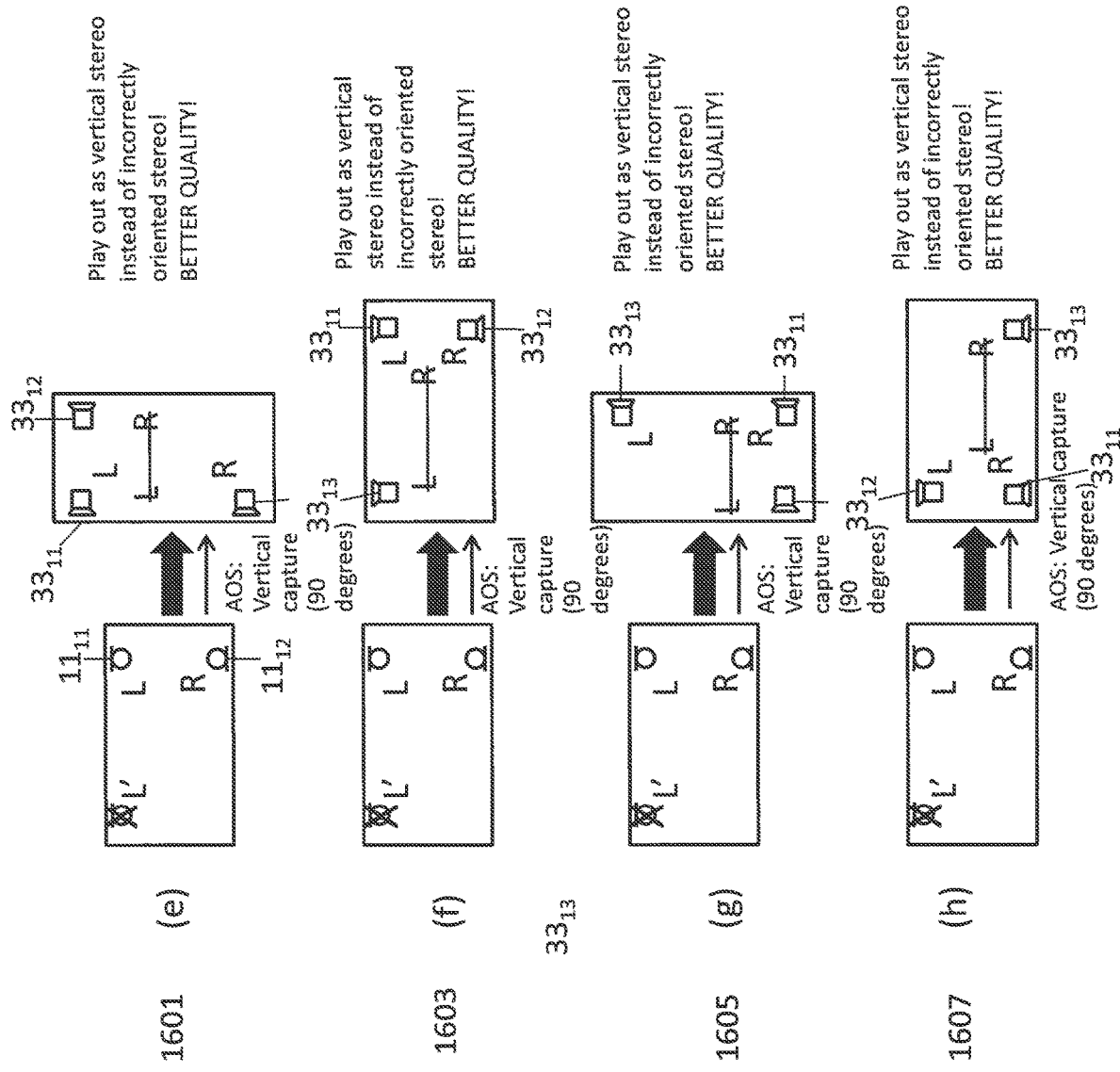

FIG. 17 shows the four situations where the recording or capture apparatus (sender apparatus) is 90 degrees clockwise from the initial orientation and the playback or rendering apparatus (receiver apparatus) is rotated with 90 degree granularity (where the rotation is measured clockwise in degrees). The microphone order generator can in these four situations be configured to generate an audio output order of L, R. In these embodiments the audio outputs are ordered or labelled such that the left(most) channel audio signal is that generated by the first microphone $11_{11}$ L and the right(most) channel audio signal is that generated by the second microphone $11_{12}$ R. However the orientation of the recording or capture apparatus is such that there is no or very little horizontal separation between the first microphone $11_{11}$ and second microphone $11_{12}$ and therefore the horizontal stereo capture effect is minimal (below a certain threshold) or there is none. FIG. 13 therefore shows that the orientation of the capture apparatus can cause a problem and as such AOS data is to be sent to permit the receiving apparatus or playback apparatus to allow for the lack of horizontal separation (or vertical capture). In some embodiments the audio output order can be made based on the orientation indicated by AOS. In other words for the example as shown in FIG. 17 the output order can be based on which microphone is located upmost and which is located downmost on the device (instead of leftmost and rightmost).

Figure 18:
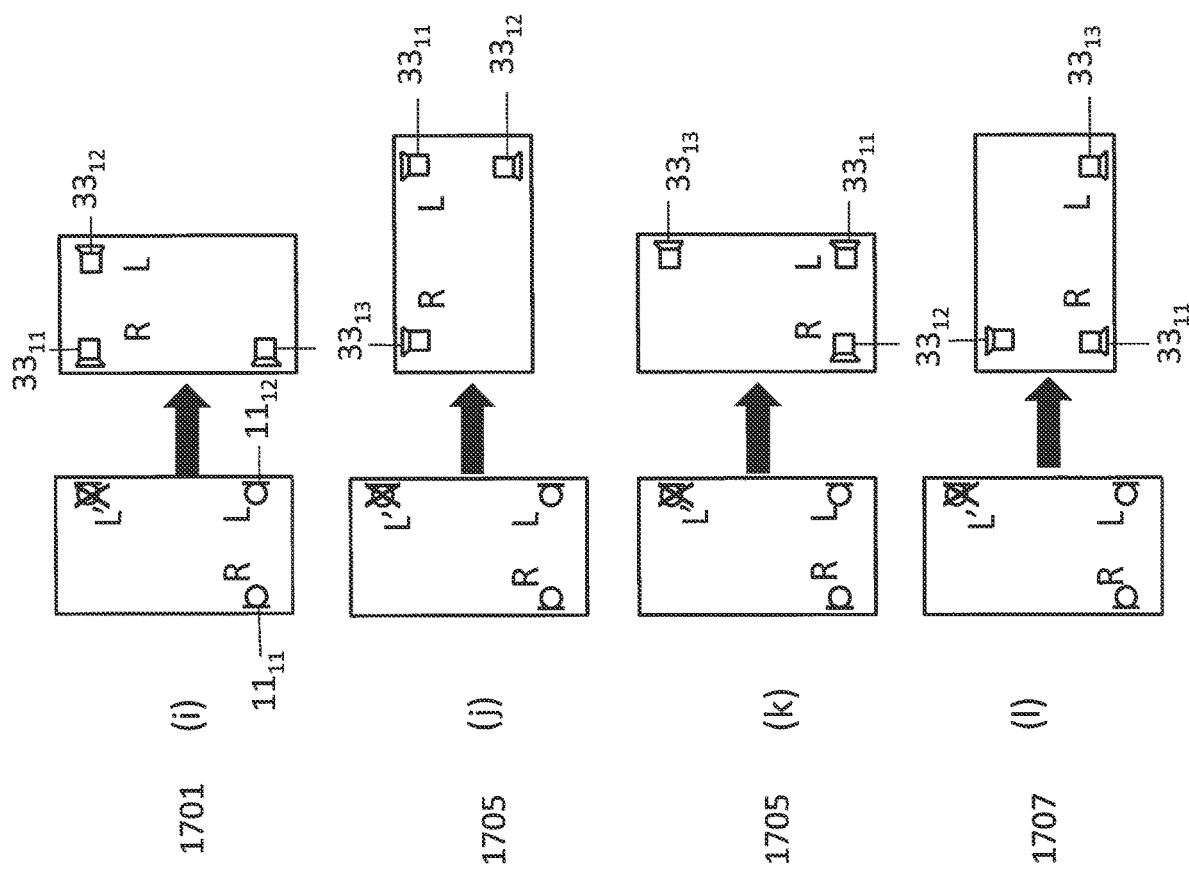

FIG. 18 shows the four situations where the recording or capture apparatus (sender apparatus) is 180 degrees clockwise from the initial orientation and the playback or rendering apparatus (receiver apparatus) is rotated with 90 degree granularity (where the rotation is measured clockwise in degrees). The microphone order generator can in these four situations be configured to generate an audio output order of R, L. In these embodiments the audio outputs are correctly ordered or labelled such that the left(most) channel audio signal is that generated by the second microphone $11_{12}$ R and the right(most) channel audio signal is that generated by the first microphone $11_{11}$ L. FIG. 18 shows that there is no problem in playback caused by the capture apparatus and as such in some embodiments there is no need to send AOS data (provided the audio outputs are correctly ordered or labelled).

Figure 19:
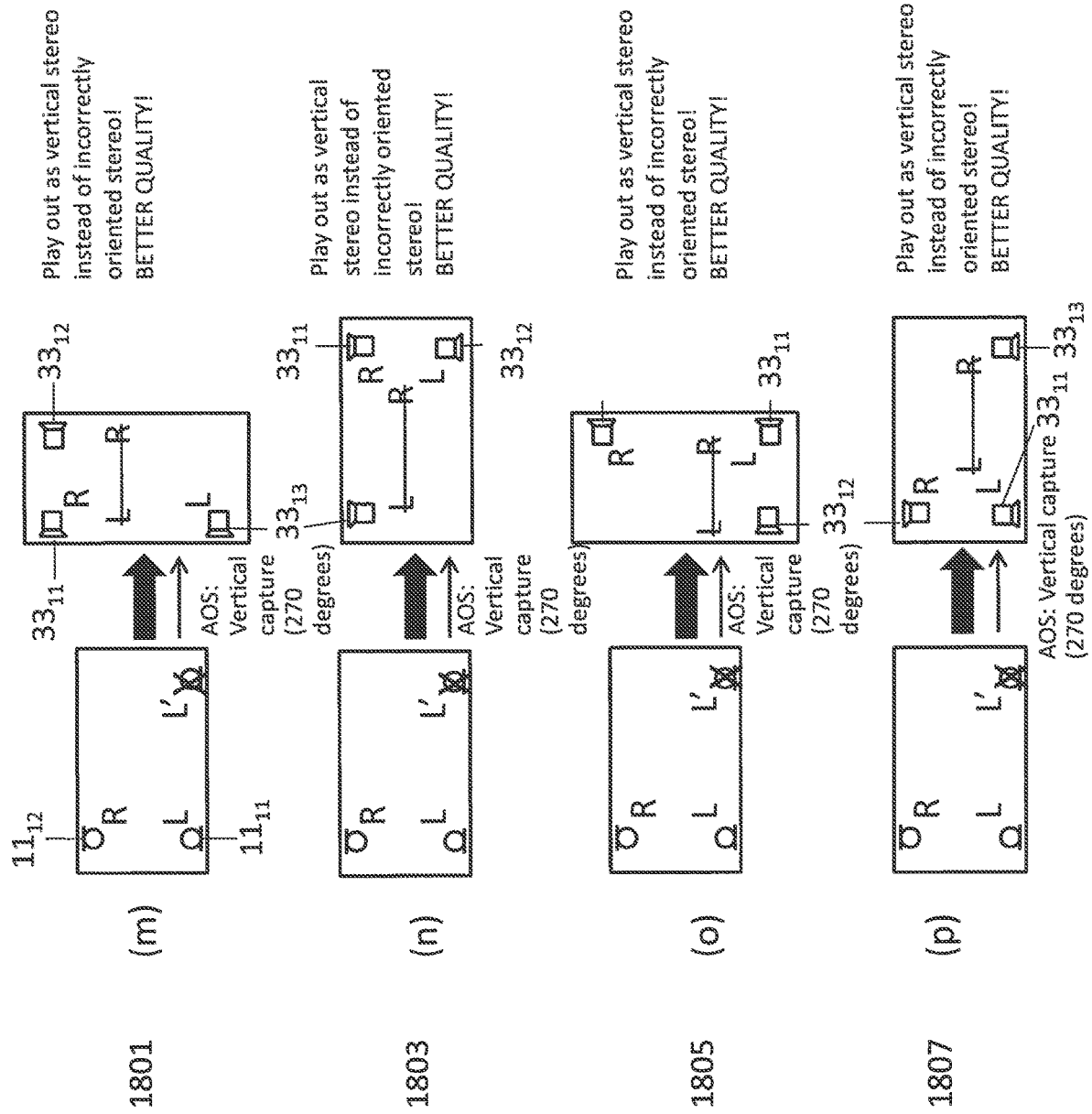

FIG. 19 shows the four situations where the recording or capture apparatus (sender apparatus) is 270 degrees clockwise from the initial orientation and the playback or rendering apparatus (receiver apparatus) is rotated with 90 degree granularity (where the rotation is measured clockwise in degrees). The microphone order generator can in these four situations be configured to generate an audio output order of R, L. In these embodiments the audio outputs are ordered or labelled such that the left(most) channel audio signal is that generated by the second microphone $11_{12}$ R and the right(most) channel audio signal is that generated by the first microphone $11_{11}$ L. However the orientation of the recording or capture apparatus is such that there is no or very little horizontal separation between the first microphone $11_{11}$ and second microphone $11_{12}$ and therefore the horizontal stereo capture effect is minimal (below a certain threshold) or there is none. FIG. 19 therefore shows that the orientation of the capture apparatus can cause a problem and as such AOS data is to be sent to permit the receiving apparatus or playback apparatus to allow for the lack of horizontal separation (or vertical capture). In addition, the audio output order is to be made based on the orientation indicated by AOS i.e. in the case of this figure it will be based on which microphone is located upmost and which is located downmost on the device (instead of leftmost and rightmost).

A fourth example audio output ordering and audio orientation signal generation situations can be shown with respect to FIGS. 20 to 23 where an example 3 microphone configuration for the capture or recording apparatus is shown and an example 2 speaker configuration for the playback or rendering apparatus is shown for orientation steps of 90°.

In the example 3 microphone configuration the initial orientation (0 degrees) is in portrait orientation with a first microphone L $11_{11}$ located to the top left of the apparatus, a second microphone R $11_{12}$ located to the top right of the apparatus and a third microphone L' $11_{13}$ located at the bottom left of the apparatus (in other words similar to the configuration as shown in FIGS. 8 to 11).

In the example 2 speaker configuration the initial orientation (0 degrees) is in portrait orientation with a first speaker L $33_{11}$ located to the top left of the apparatus, and a speaker microphone R $33_{12}$ located to the top right of the apparatus. In other words similar to the example 3 speaker configuration shown in FIGS. 8 to 11 but with the third speaker removed or disabled or switched off (in other words similar to the configuration shown in FIGS. 12 to 15).

Figure 20:
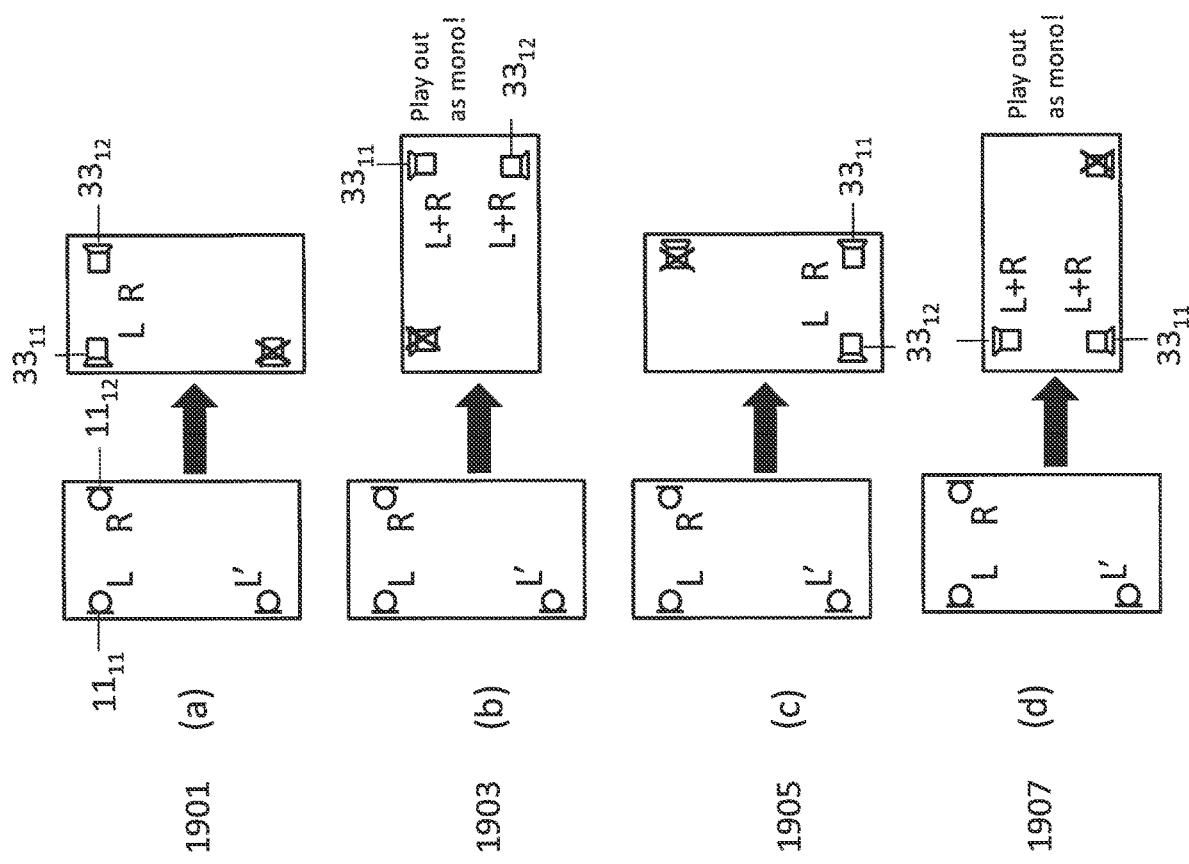
FIGS. 20 to 23 show example 3 microphone capture apparatus and 2 speaker playback apparatus orientation combinations for 90 degree rotations according to some embodiments.

FIG. 20 for example shows the four situations where the recording or capture apparatus (sender apparatus) is in initial orientation and the playback or rendering apparatus (receiver apparatus) is rotated with 90 degree granularity (where the rotation is measured clockwise in degrees). The microphone order generator can in these four situations be configured to generate an audio output order of L, R, L'. In these embodiments the audio outputs are correctly ordered or labelled such that the left(most) channel audio signal is that generated by the first microphone $11_{11}$ L and the right(most) channel audio signal is that generated by the second microphone $11_{12}$ R. It would be understood that in some embodiments the left(most) channel audio signal can be that generated by the third microphone $11_{13}$ L'. FIG. 20 shows that there is no problem in playback caused by the capture apparatus and as such in some embodiments there is no need to send AOS data.

Figure 21:
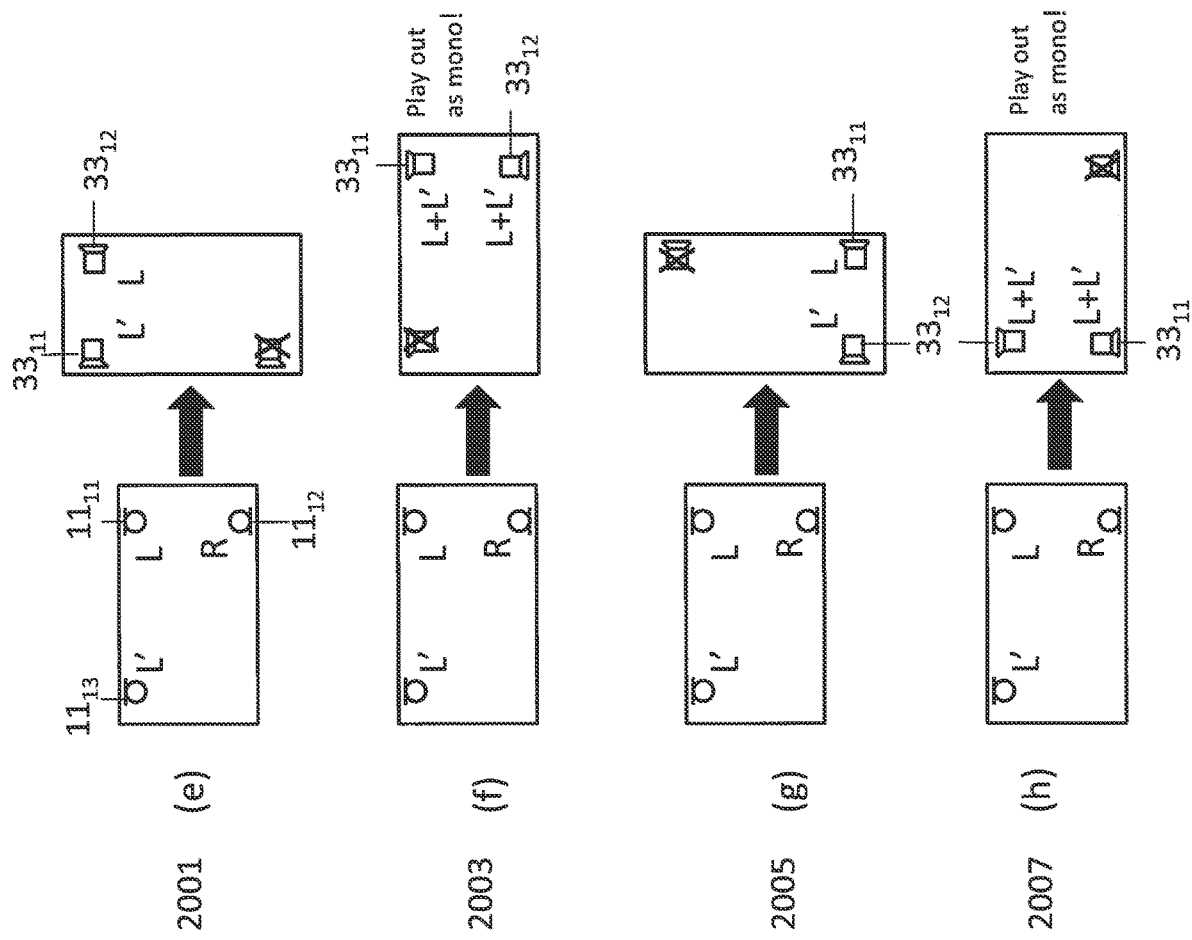

FIG. 21 shows the four situations where the recording or capture apparatus (sender apparatus) is 90 degrees clockwise from the initial orientation and the playback or rendering apparatus (receiver apparatus) is rotated with 90 degree granularity (where the rotation is measured clockwise in degrees). The microphone order generator can in these four situations be configured to generate an audio output order of L', L, R. In these embodiments the audio outputs are correctly ordered or labelled such that the left(most) channel audio signal is that generated by the third microphone $11_{13}$ L' and the right(most) channel audio signal is that generated by the first microphone $11_{11}$ L. It would be understood that in some embodiments the right(most) channel audio signal can be that generated by the second microphone $11_{12}$ R. FIG. 21 shows that there is no problem in playback caused by the capture apparatus and as such in some embodiments there is no need to send AOS data (provided the audio outputs are correctly ordered or labelled).

Figure 22:
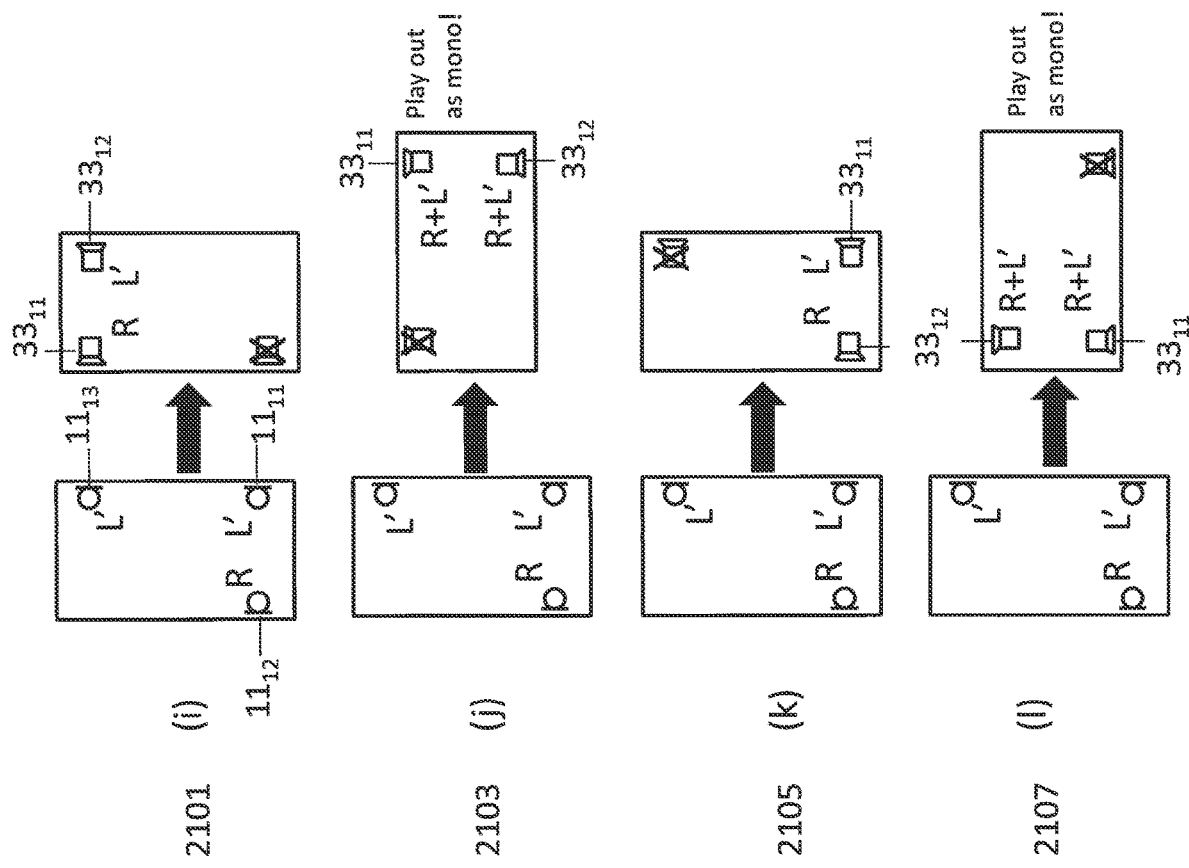

FIG. 22 shows the four situations where the recording or capture apparatus (sender apparatus) is 180 degrees clockwise from the initial orientation and the playback or rendering apparatus (receiver apparatus) is rotated with 90 degree granularity (where the rotation is measured clockwise in degrees). The microphone order generator can in these four situations be configured to generate an audio output order of R, L, L'. In these embodiments the audio outputs are correctly ordered or labelled such that the left(most) channel audio signal is that generated by the second microphone $11_{12}$ R and the right(most) channel audio signal is that generated by the first microphone $11_{11}$ L. It would be understood that in some embodiments the right (most) channel audio signal can be that generated by the third microphone $11_{13}$ L'. FIG. 22 shows that there is no problem in playback caused by the capture apparatus and as such in some embodiments there is no need to send AOS data (provided the audio outputs are correctly ordered or labelled).

Figure 23:
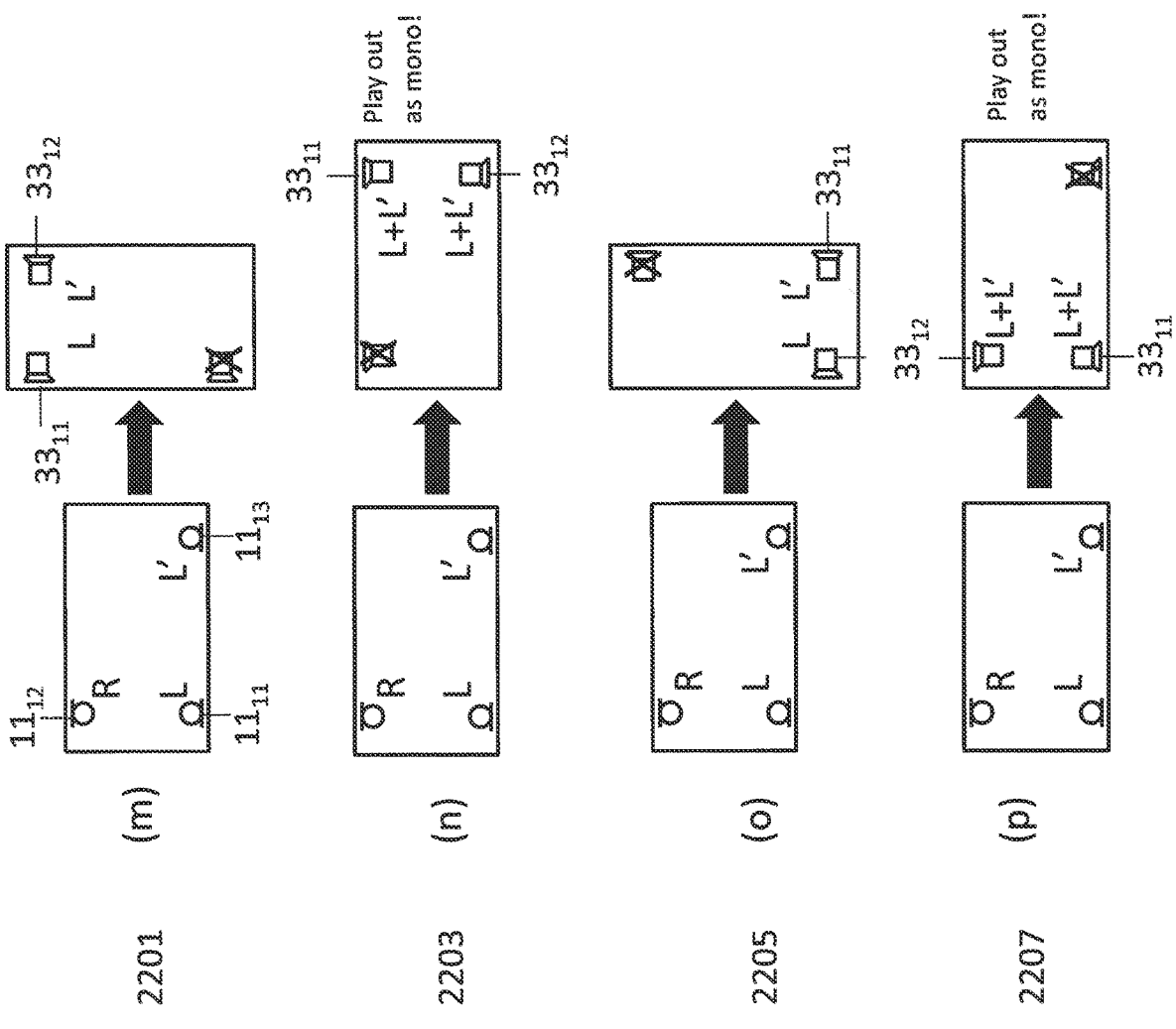

FIG. 23 shows the four situations where the recording or capture apparatus (sender apparatus) is 270 degrees clockwise from the initial orientation and the playback or rendering apparatus (receiver apparatus) is rotated with 90 degree granularity (where the rotation is measured clockwise in degrees). The microphone order generator can in these four situations be configured to generate an audio output order of L, L', R. In these embodiments the audio outputs are correctly ordered or labelled such that the left(most) channel audio signal is that generated by the first microphone $11_{11}$ L and the right(most) channel audio signal is that generated by the third microphone $11_{13}$ L'. It would be understood that in some embodiments the left(most) channel audio signal can be that generated by the second microphone $11_{12}$ R. FIG. 13 shows that there is no problem in playback caused by the capture apparatus and as such in some embodiments there is no need to send AOS data (provided the audio outputs are correctly ordered or labelled).

Figure 5:
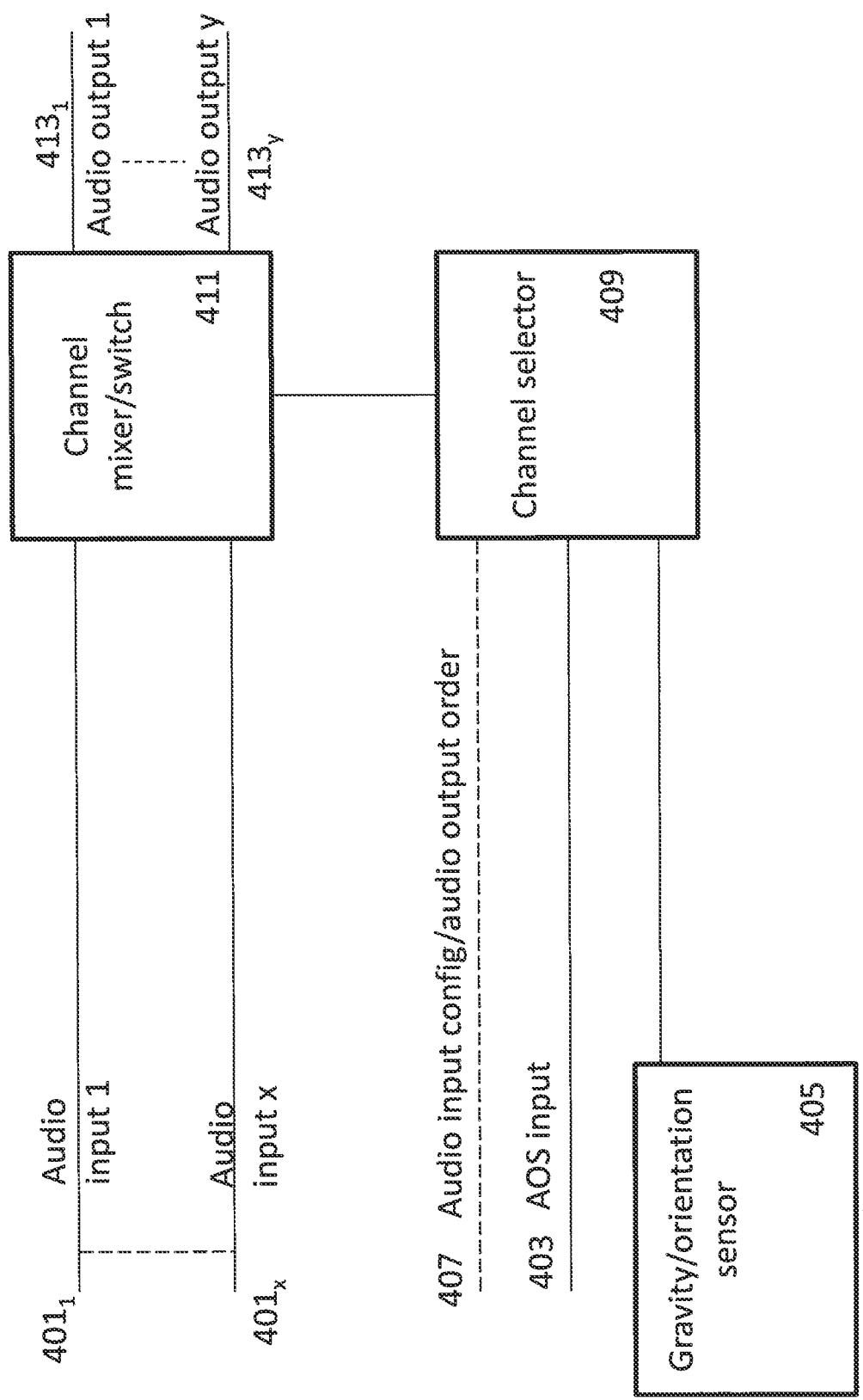
FIG. 5 shows schematically an example audio playback apparatus according to some embodiments.

With respect to FIG. 5 an example receiving or playback apparatus is shown according to some embodiments. Furthermore with respect to FIGS. 6 and 7 example operations of the playback or receiving apparatus as shown in FIG. 5 are described.

In some embodiments of the receiving apparatus is configured to receive the AOS input 403. The AOS input 403 can in some embodiments be passed to a channel selector 409.

Figure 7:
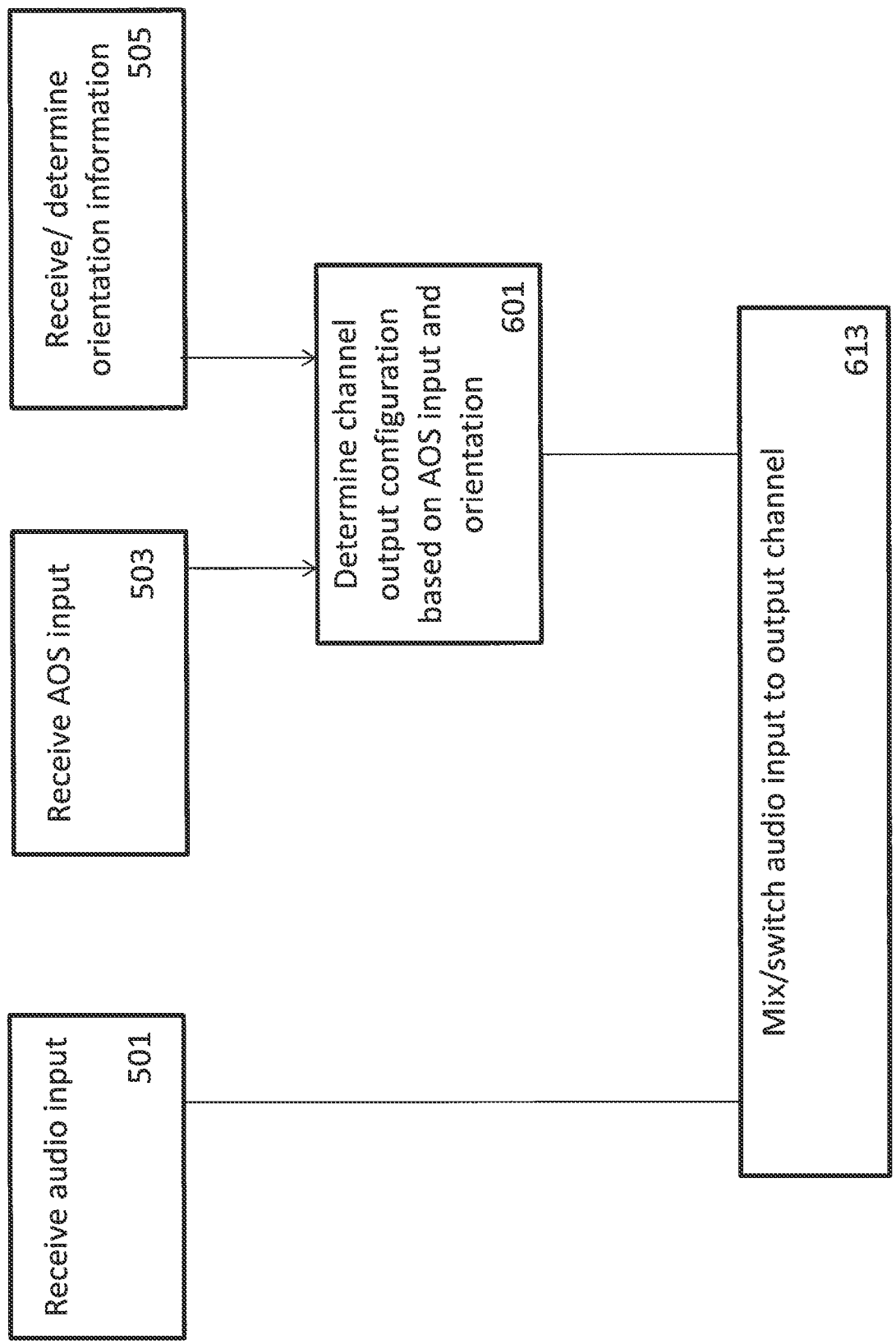
FIG. 7 shows schematically a further flow diagram of further operations of the audio playback apparatus shown in FIG. 5 according to some embodiments.

The operation of receiving the AOS input is shown in FIG. 7 by step 503.

Furthermore in some embodiments the apparatus comprises a gravity/orientation sensor 405. The gravity/orientation sensor 405 is configured to perform a similar role as the gravity/orientation sensor described in the recording or capture apparatus. The gravity/orientation sensor 405 is configured to provide an orientation output to the channel selector 409.

Figure 6:
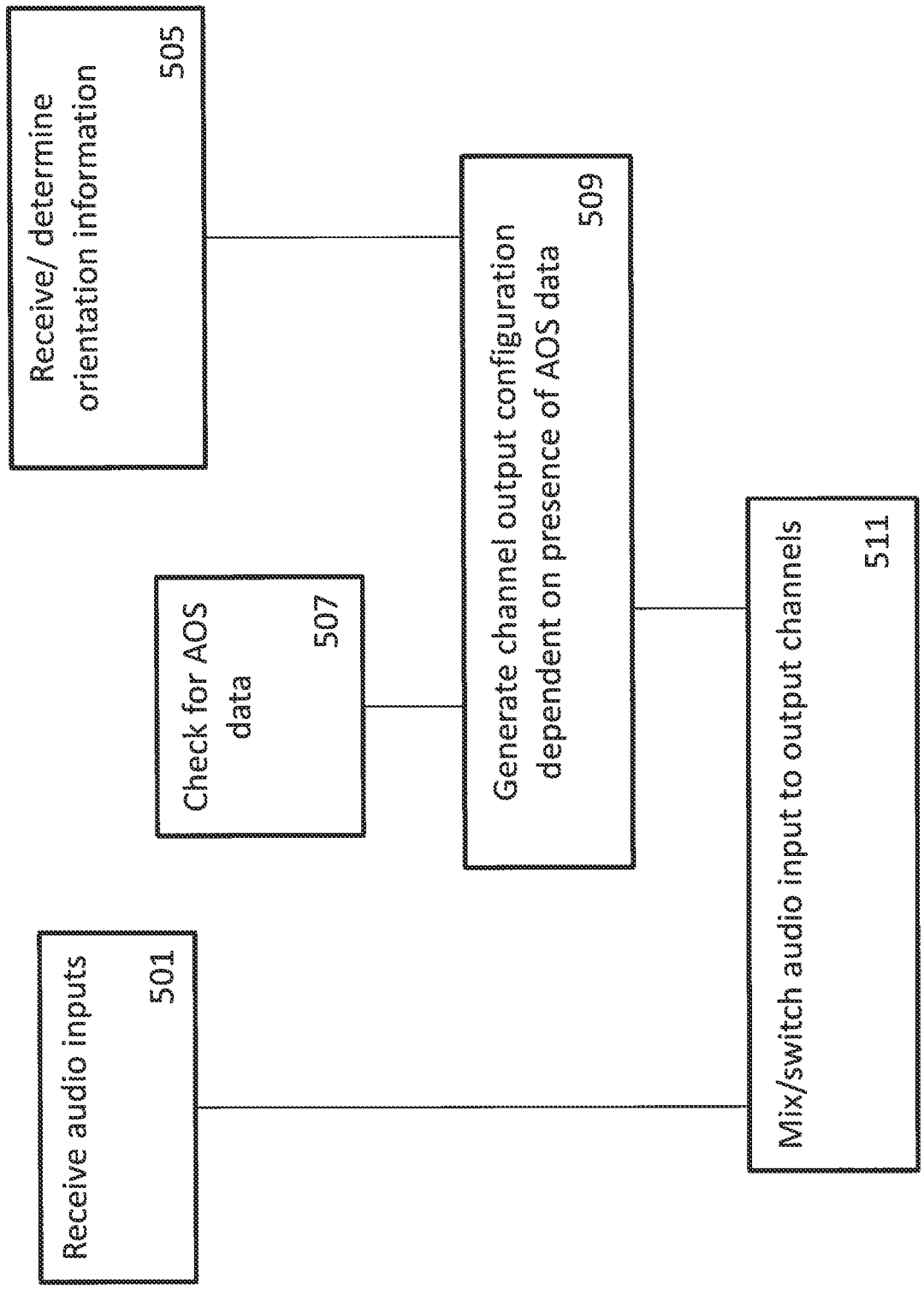
FIG. 6 shows schematically a flow diagram of the operation of the audio playback apparatus shown in FIG. 5 according to some embodiments.

The operation of receiving the/determining orientation information is shown in FIGS. 6 and 7 by step 505.

In some embodiments the playback or receiving apparatus comprises a channel selector 409. The channel selector 409 can be configured to receive the AOS input 403, and the gravity/orientation sensor output from the gravity/orientation sensor 405. Furthermore in some embodiments the channel selector 409 can be configured to receive audio input configuration/audio output order information from the capture or recording apparatus.

In some embodiments the channel selector 409 can be configured to determine from the orientation sensor input value and the AOS input the channel output configurations.

It would be understood that the channel selector 409 is configured to perform this configuration having knowledge of the playback apparatus speaker configuration. In other words with knowledge of when possible problems in playback can occur such as for example what orientation would produce no horizontal separation between speakers.

In some embodiments the channel selector 409 can further be configured to perform the channel output determination based on the audio input configuration information or audio output order information passed from the capture or recording device. For example where the audio signal input is not arranged in the audio output order but is effectively ordered by the channel selector 409.

The operation of determining the channel output configurations based on the AOS input and orientation information is shown in FIG. 7 by step 601.

Furthermore in some embodiments the audio playback apparatus is configured to receive the audio input. The audio inputs are shown in FIG. 5 as audio input 1 $401_1$ and audio input X $401_x$. The audio inputs are passed to the channel mixer/switch 411.

In some embodiments the receiving or playback apparatus comprises a channel mixer/switch 411. The channel mixer/switch 411 can be configured to receive input from the channel selector 409 and mix and/or switch the audio inputs to generate suitable audio outputs. For example as shown in FIG. 5 a first audio output 1 $413_1$ and audio output Y $413_Y$.

The operation of mixing or switching the audio inputs to output channels is shown in FIG. 7 by step 613.

The operation as shown in FIG. 6 differs from that shown in FIG. 7 in that the channel selector is configured to generate the channel output configuration dependent on the presence of the AOS data. In other words the embodiments as shown in FIG. 6 differs from the embodiments in FIG. 7 in that the apparatus as represented in the embodiments shown in FIG. 6 is configured to generate channel output configuration only when the AOS data is provided where the output configuration is based on a combination of the factors of the received AOS data and the orientation information and otherwise the 'initial' orientation conditions are used in the channel mixer/switch 411.

With respect to FIG. 7 the apparatus is configured to receive AOS data at known periods or continuously and as such is configured to determine the channel output configuration based on the AOS data and the orientation information.

The operation of checking for AOS data is shown in FIG. 6 by step 507.

The operation of generating channel output configurations based dependent on the presence of AOS data is shown in FIG. 6 by step 509.

Example audio input to output configuration situations can be shown with respect to FIGS. 8 to 11 where an example 3 microphone configuration for the capture or recording apparatus is shown for orientation steps of 90° and an example 3 speaker configuration for the playback or rendering apparatus is shown for orientation steps of 90°.

Thus for example FIG. 8 shows that where the capture or recording apparatus and the playback apparatus or receiver both are in initial orientation 701 the left channel audio signal L is output on the first speaker $33_{11}$ and the right channel audio signal R is output on the second speaker $33_{12}$.

Where the playback apparatus or receiver is rotated by 90 degrees 703 the left channel audio signal L is output on the third speaker $33_{13}$ and the right channel audio signal R is output on the first speaker $33_{11}$. Where the playback apparatus or receiver is rotated by 180 degrees 705 the left channel audio signal L is output on the second speaker $33_{12}$ and the right channel audio signal R is output on the first speaker $33_{11}$. Furthermore where the playback apparatus or receiver is rotated by 270 degrees 707 the left channel audio signal L is output on the first speaker $33_{11}$ and the right channel audio signal R is output on the third speaker $33_{13}$.

Thus for example FIG. 9 shows that where the recording or capture apparatus has been rotated by 90 degrees clockwise from the initial position and where the playback apparatus or receiver is in initial orientation 801 the left channel audio signal L' is output on the first speaker $33_{11}$ and the right channel audio signal L is output on the second speaker $33_{12}$. Where the playback apparatus or receiver is rotated by 90 degrees 803 the left channel audio signal L' is output on the third speaker $33_{13}$ and the right channel audio signal L is output on the first speaker $33_{11}$. Where the playback apparatus or receiver is rotated by 180 degrees 805 the left channel audio signal L' is output on the second speaker $33_{12}$ and the right channel audio signal L is output on the first speaker $33_{11}$. Furthermore where the playback apparatus or receiver is rotated by 270 degrees 807 the left channel audio signal L' is output on the first speaker $33_{11}$ and the right channel audio signal L is output on the third speaker $33_{13}$.

Thus for example FIG. 10 shows that where the recording or capture apparatus has been rotated by 180 degrees clockwise from the initial position and where the playback apparatus or receiver is in initial orientation 901 the left channel audio signal R is output on the first speaker $33_{11}$ and the right channel audio signal L is output on the second speaker $33_{12}$. Where the playback apparatus or receiver is rotated by 90 degrees 903 the left channel audio signal R is output on the third speaker $33_{13}$ and the right channel audio signal L is output on the first speaker $33_{11}$. Where the playback apparatus or receiver is rotated by 180 degrees 905 the left channel audio signal R is output on the second speaker $33_{12}$ and the right channel audio signal L is output on the first speaker $33_{11}$. Furthermore where the playback apparatus or receiver is rotated by 270 degrees 907 the left channel audio signal R is output on the first speaker $33_{11}$ and the right channel audio signal L is output on the third speaker $33_{13}$.

Thus for example FIG. 11 shows that where the recording or capture apparatus has been rotated by 270 degrees clockwise from the initial position and where the playback apparatus or receiver is in initial orientation 1001 the left channel audio signal L is output on the first speaker $33_{11}$ and the right channel audio signal L' is output on the second speaker $33_{12}$. Where the playback apparatus or receiver is rotated by 90 degrees 1003 the left channel audio signal L is output on the third speaker $33_{13}$ and the right channel audio signal L' is output on the first speaker $33_{11}$. Where the playback apparatus or receiver is rotated by 180 degrees 1005 the left channel audio signal L is output on the second speaker $33_{12}$ and the right channel audio signal L' is output on the first speaker $33_{11}$. Furthermore where the playback apparatus or receiver is rotated by 270 degrees 1007 the left channel audio signal L is output on the first speaker $33_{11}$ and the right channel audio signal L' is output on the third speaker $33_{13}$.

A further example audio input to output configuration situations can be shown with respect to FIGS. 12 to 15 where an example 2 microphone configuration for the capture or recording apparatus is shown for orientation steps of 90° and an example 2 speaker configuration for the playback or rendering apparatus is shown for orientation steps of 90°.

Thus for example FIG. 12 shows that where the recording or capture apparatus and the playback apparatus or receiver both are in initial orientation 1101 the left channel audio signal L is output on the first speaker $33_{11}$ and the right channel audio signal R is output on the second speaker $33_{12}$. Where the playback apparatus or receiver is rotated by 90 degrees 1103 the orientation of the playback apparatus is such that there is no horizontal separation between the first speaker $33_{11}$ and second speaker $33_{12}$ and therefore only a mono mixed version of the combined left channel audio signal L and right channel audio signal R (L+R) is output on both the first speaker $33_{11}$ and second speaker $33_{12}$. Where the playback apparatus or receiver is rotated by 180 degrees 1105 the left channel audio signal L is output on the second speaker $33_{12}$ and the right channel audio signal R is output on the first speaker $33_{11}$. Furthermore where the playback apparatus or receiver is rotated by 270 degrees 1107 the orientation of the playback apparatus is such that there is no horizontal separation between the first speaker $33_{11}$ and second speaker $33_{12}$ and therefore only a mono mixed version of the combined left channel audio signal L and right channel audio signal R (L+R) is output on both the first speaker $33_{11}$ and second speaker $33_{12}$.

Thus for example FIG. 13 shows that where the recording or capture apparatus has been rotated by 90 degrees clockwise from the initial position and where the playback apparatus or receiver is in initial orientation 1201 the AOS data causes a mono mixed version of the combined left channel audio signal L and right channel audio signal R (L+R) to be output on both the first speaker $33_{11}$ and second speaker $33_{12}$. When the AOS signal indicates vertical capture, the playback apparatus or receiver treats the received signals (in this example figure and in other example figures below) as captured by microphones positioned vertically with respect to each other. Where the playback apparatus or receiver is rotated by 90 degrees 1203 the AOS data causes the left channel audio signal L to be output on the first speaker $33_{11}$ and the right channel audio signal R to be output on the second speaker $33_{12}$. In such a manner the receiver is configured to output the received audio signals as a vertical stereo output. Where the playback apparatus or receiver is rotated by 180 degrees 1205 the AOS data causes a mono mixed version of the combined left channel audio signal L and right channel audio signal R (DR) to be output on both the first speaker $33_{11}$ and second speaker $33_{12}$. Furthermore where the playback apparatus or receiver is rotated by 270 degrees 1207 the AOS data causes the left channel audio signal L to be output on the second speaker $33_{12}$ and the right channel audio signal R to be output on the first speaker $33_{11}$ and therefore to output the received audio signals as a vertical stereo output.

Thus for example FIG. 14 shows that where the recording or capture apparatus has been rotated by 180 degrees clockwise from the initial position and where the playback apparatus or receiver is in initial orientation 1301 the left channel audio signal R is output on the first speaker $33_{11}$ and the right channel audio signal L is output on the second speaker $33_{12}$. Where the playback apparatus or receiver is rotated by 90 degrees 1303 the orientation of the playback apparatus is such that there is no horizontal separation between the first speaker $33_{11}$ and second speaker $33_{12}$ and therefore only a mono mixed version of the combined left channel audio signal R and right channel audio signal L (L+R) is output on both the first speaker $33_{11}$ and second speaker $33_{12}$. Where the playback apparatus or receiver is rotated by 180 degrees 1305 the left channel audio signal R is output on the second speaker $33_{12}$ and the right channel audio signal L is output on the first speaker $33_{11}$. Furthermore where the playback apparatus or receiver is rotated by 270 degrees 1307 the orientation of the playback apparatus is such that there is no horizontal separation between the first speaker $33_{11}$ and second speaker $33_{12}$ and therefore only a mono mixed version of the combined left channel audio signal R and right channel audio signal L (L+R) is output on both the first speaker $33_{11}$ and second speaker $33_{12}$.

Thus for example FIG. 15 shows that where the recording or capture apparatus has been rotated by 270 degrees clockwise from the initial position and where the playback apparatus or receiver is in initial orientation 1401 the AOS data causes a mono mixed version of the combined left channel audio signal R and right channel audio signal L (L+R) to be output on both the first speaker $33_{11}$ and second speaker $33_{12}$. Where the playback apparatus or receiver is rotated by 90 degrees 1403 the AOS data causes the left channel audio signal R to be output on the first speaker $33_{11}$ and the right channel audio signal L to be output on the second speaker $33_{12}$. In such a manner the receiver is configured to output the received audio signals as a vertical stereo output. Where the playback apparatus or receiver is rotated by 180 degrees 1405 the AOS data causes a mono mixed version of the combined left channel audio signal R and right channel audio signal L (L+R) to be output on both the first speaker $33_{11}$ and second speaker $33_{12}$. Furthermore where the playback apparatus or receiver is rotated by 270 degrees 1407 the AOS data causes the left channel audio signal R to be output on the second speaker $33_{12}$ and the right channel audio signal L to be output on the first speaker $33_{11}$ the left channel audio signal L' is output on the first speaker $33_{11}$ and therefore to output the received audio signals as a vertical stereo output.

A further example audio input to output configuration situations can be shown with respect to FIGS. 16 to 19 where an example 2 microphone configuration for the capture or recording apparatus is shown for orientation steps of 90° and an example 3 speaker configuration for the playback or rendering apparatus is shown for orientation steps of 90°.

Thus for example FIG. 16 shows that where the capture or recording apparatus and the playback apparatus or receiver both are in initial orientation 1501 the left channel audio signal L is output on the first speaker $33_{11}$ and the right channel audio signal R is output on the second speaker $33_{12}$. Where the playback apparatus or receiver is rotated by 90 degrees 1503 the left channel audio signal L is output on the third speaker $33_{13}$ and the right channel audio signal R is output on the first speaker $33_{11}$. Where the playback apparatus or receiver is rotated by 180 degrees 1505 the left channel audio signal L is output on the second speaker $33_{12}$ and the right channel audio signal R is output on the first speaker $33_{11}$. Furthermore where the playback apparatus or receiver is rotated by 270 degrees 1507 the left channel audio signal L is output on the first speaker $33_{11}$ and the right channel audio signal R is output on the third speaker $33_{13}$.

Thus for example FIG. 17 shows that where the recording or capture apparatus has been rotated by 90 degrees clockwise from the initial position and where the playback apparatus or receiver is in initial orientation 1601 the AOS data causes the left channel audio signal L to be output on the first speaker $33_{11}$ and the right channel audio signal R to be output on the third speaker $33_{13}$. Thus in such a manner the receiver is configured to output the received audio signals as a vertical stereo output and produce a better quality output. Where the playback apparatus or receiver is rotated by 90 degrees 1603 the AOS data causes the left channel audio signal L to be output on the first speaker $33_{11}$ and the right channel audio signal R to be output on the second speaker $33_{12}$. Therefore the receiver is configured to output the received audio signals as an improved quality vertical stereo output. Where the playback apparatus or receiver is rotated by 180 degrees 1605 the AOS data causes the left channel audio signal L to be output on the third speaker $33_{13}$ and the right channel audio signal R to be output on the first speaker $33_{11}$. Thus in such a manner the receiver is also configured to output the received audio signals as a vertical stereo output and produce a better quality output. Furthermore where the playback apparatus or receiver is rotated by 270 degrees 1607 the AOS data causes the left channel audio signal L to be output on the second speaker $33_{12}$ and the right channel audio signal R to be output on the first speaker $33_{11}$ and therefore to output the received audio signals as a vertical stereo output.

Thus for example FIG. 18 shows that where the recording or capture apparatus has been rotated by 180 degrees clockwise from the initial position and where the playback apparatus or receiver is in initial orientation 1701 the left channel audio signal R is output on the first speaker $33_{11}$ and the right channel audio signal L is output on the second speaker $33_{12}$. Where the playback apparatus or receiver is rotated by 90 degrees 1703 the left channel audio signal R is output on the third speaker $33_{13}$ and the right channel audio signal L is output on the first speaker $33_{11}$. Where the playback apparatus or receiver is rotated by 180 degrees 1705 the left channel audio signal R is output on the second speaker $33_{12}$ and the right channel audio signal L is output on the first speaker $33_{11}$. Furthermore where the playback apparatus or receiver is rotated by 270 degrees 1707 the left channel audio signal R is output on the first speaker $33_{11}$ and the right channel audio signal L is output on the third speaker $33_{13}$.

Thus for example FIG. 19 shows that where the recording or capture apparatus has been rotated by 270 degrees clockwise from the initial position and where the playback apparatus or receiver is in initial orientation 1801 the AOS data causes the left channel audio signal R to be output on the first speaker $33_{11}$ and the right channel audio signal L to be output on the third speaker $33_{13}$. Thus in such a manner the receiver is configured to output the received audio signals as a vertical stereo output and produce a better quality output. Where the playback apparatus or receiver is rotated by 90 degrees 1803 the AOS data causes the left channel audio signal R to be output on the first speaker $33_{11}$ and the right channel audio signal L to be output on the second speaker $33_{12}$. Therefore the receiver is configured to output the received audio signals as an improved quality vertical stereo output. Where the playback apparatus or receiver is rotated by 180 degrees 1805 the AOS data causes the left channel audio signal R to be output on the third speaker $33_{13}$ and the right channel audio signal L to be output on the first speaker $33_{11}$. Thus in such a manner the receiver is also configured to output the received audio signals as a vertical stereo output and produce a better quality output. Furthermore where the playback apparatus or receiver is rotated by 270 degrees 1807 the AOS data causes the left channel audio signal R to be output on the second speaker $33_{12}$ and the right channel audio signal L to be output on the first speaker $33_{11}$ and therefore to output the received audio signals as a vertical stereo output.

The fourth example audio input to output configuration situations can be shown with respect to FIGS. 20 to 23 where an example 3 microphone configuration for the capture or recording apparatus is shown for orientation steps of 90° and an example 2 speaker configuration for the playback or rendering apparatus is shown for orientation steps of 90°.

Thus for example FIG. 20 shows that where the capture or recording apparatus and playback apparatus or receiver both are in initial orientation 1901 the left channel audio signal L is output on the first speaker $33_{11}$ and the right channel audio signal R is output on the second speaker $33_{12}$. Where the playback apparatus or receiver is rotated by 90 degrees 1903 the orientation of the playback apparatus is such that there is no horizontal separation between the first speaker $33_{11}$ and second speaker $33_{12}$ and therefore only a mono mixed version of the combined left channel audio signal L and right channel audio signal R (L+R) is output on both the first speaker $33_{11}$ and second speaker $33_{12}$. In other words a mono mixed output is provided. Where the playback apparatus or receiver is rotated by 180 degrees 1905 the left channel audio signal L is output on the second speaker $33_{12}$ and the right channel audio signal R is output on the first speaker $33_{11}$. Furthermore where the playback apparatus or receiver is rotated by 270 degrees 1907 the orientation of the playback apparatus is also such that there is no horizontal separation between the first speaker $33_{11}$ and second speaker $33_{12}$ and therefore only a mono mixed version of the combined left channel audio signal L and right channel audio signal R (L+R) is output on both the first speaker $33_{11}$ and second speaker $33_{12}$.

Thus for example FIG. 21 shows that where the recording or capture apparatus has been rotated by 90 degrees clockwise from the initial position and where the playback apparatus or receiver is in initial orientation 2001 the left channel audio signal L' is output on the first speaker $33_{11}$ and the right channel audio signal L is output on the second speaker $33_{12}$. Where the playback apparatus or receiver is rotated by 90 degrees 2003 the orientation of the playback apparatus is such that there is no horizontal separation between the first speaker $33_{11}$ and second speaker $33_{12}$ and therefore only a mono mixed version of the combined left channel audio signal L' and right channel audio signal L (L+L') is output on both the first speaker $33_{11}$ and second speaker $33_{12}$. Where the playback apparatus or receiver is rotated by 180 degrees 2005 the left channel audio signal L' is output on the second speaker $33_{12}$ and the right channel audio signal L is output on the first speaker $33_{11}$. Furthermore where the playback apparatus or receiver is rotated by 270 degrees 2007 the orientation of the playback apparatus is such that there is no horizontal separation between the first speaker $33_{11}$ and second speaker $33_{12}$ and therefore only a mono mixed version of the combined left channel audio signal L' and right channel audio signal L (L+L') is output on both the first speaker $33_{11}$ and second speaker $33_{12}$.

Thus for example FIG. 22 shows that where the recording or capture apparatus has been rotated by 180 degrees clockwise from the initial position and where the playback apparatus or receiver is in initial orientation 2101 the left channel audio signal R is output on the first speaker $33_{11}$ and the right channel audio signal L is output on the second speaker $33_{12}$. Where the playback apparatus or receiver is rotated by 90 degrees 2103 the orientation of the playback apparatus is such that there is no horizontal separation between the first speaker $33_{11}$ and second speaker $33_{12}$ and therefore only a mono mixed version of the combined left channel audio signal R and right channel audio signal L (R+L) is output on both the first speaker $33_{11}$ and second speaker $33_{12}$. Where the playback apparatus or receiver is rotated by 180 degrees 2105 the left channel audio signal R is output on the second speaker $33_{12}$ and the right channel audio signal L is output on the first speaker $33_{11}$. Furthermore where the playback apparatus or receiver is rotated by 270 degrees 2107 the orientation of the playback apparatus is such that there is no horizontal separation between the first speaker $33_{11}$ and second speaker $33_{12}$ and therefore only a mono mixed version of the combined left channel audio signal R and right channel audio signal L (R+L) is output on both the first speaker $33_{11}$ and second speaker $33_{12}$.

Thus for example FIG. 23 shows that where the recording or capture apparatus has been rotated by 270 degrees clockwise from the initial position and where the playback apparatus or receiver is in initial orientation 2201 the left channel audio signal L is output on the first speaker $33_{11}$ and the right channel audio signal L' is output on the second speaker $33_{12}$. Where the playback apparatus or receiver is rotated by 90 degrees 2203 the orientation of the playback apparatus is such that there is no horizontal separation between the first speaker $33_{11}$ and second speaker $33_{12}$ and therefore only a mono mixed version of the combined left channel audio signal L and right channel audio signal L' (L+L') is output on both the first speaker $33_{11}$ and second speaker $33_{12}$. Where the playback apparatus or receiver is rotated by 180 degrees 2205 the left channel audio signal L is output on the second speaker $33_{12}$ and the right channel audio signal L' is output on the first speaker $33_{11}$. Furthermore where the playback apparatus or receiver is rotated by 270 degrees 2207 the orientation of the playback apparatus is such that there is no horizontal separation between the first speaker $33_{11}$ and second speaker $33_{12}$ and therefore only a mono mixed version of the combined left channel audio signal L and right channel audio signal L' (L+L') is output on both the first speaker $33_{11}$ and second speaker $33_{12}$.

During the recording the capturing device may be rotated in several subsequent rotations and each rotation may change the orientation of the audio capture, first from the initial orientation to a new orientation and then later from the new orientation to a further new orientation. The disclosed method may be applied for each rotation to ensure that audio playback orientation is aligned with the recording orientation. In other words the capture device can determine a difference in orientation from a determined orientation and an earlier orientation. In some situations the earlier orientation can be an initial orientation.

Figure 26:
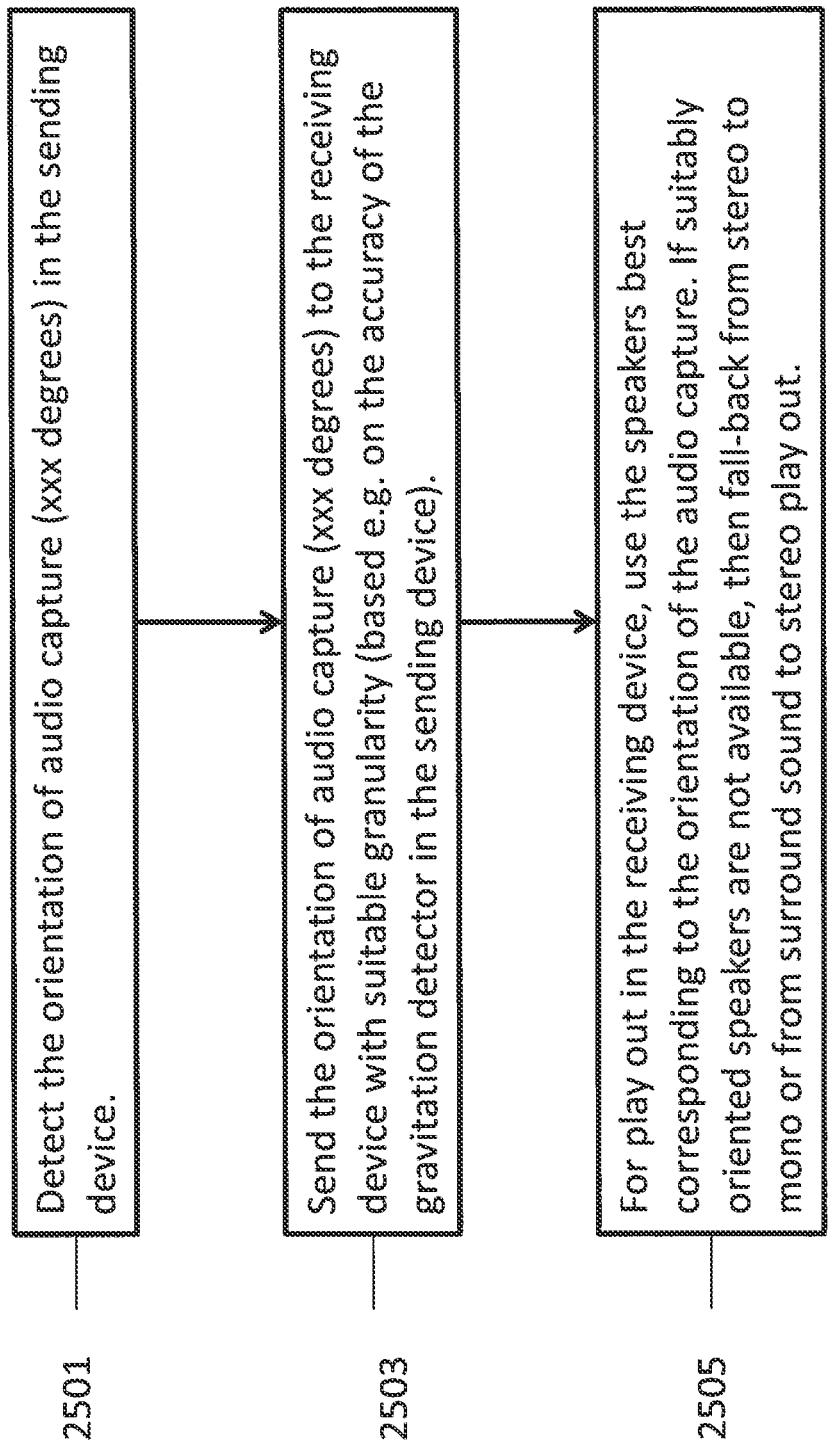
FIG. 26 shows schematically a flow diagram of the operation of audio recording and playback systems with arbitrary orientation sensing according to some embodiments.
Figure 27:
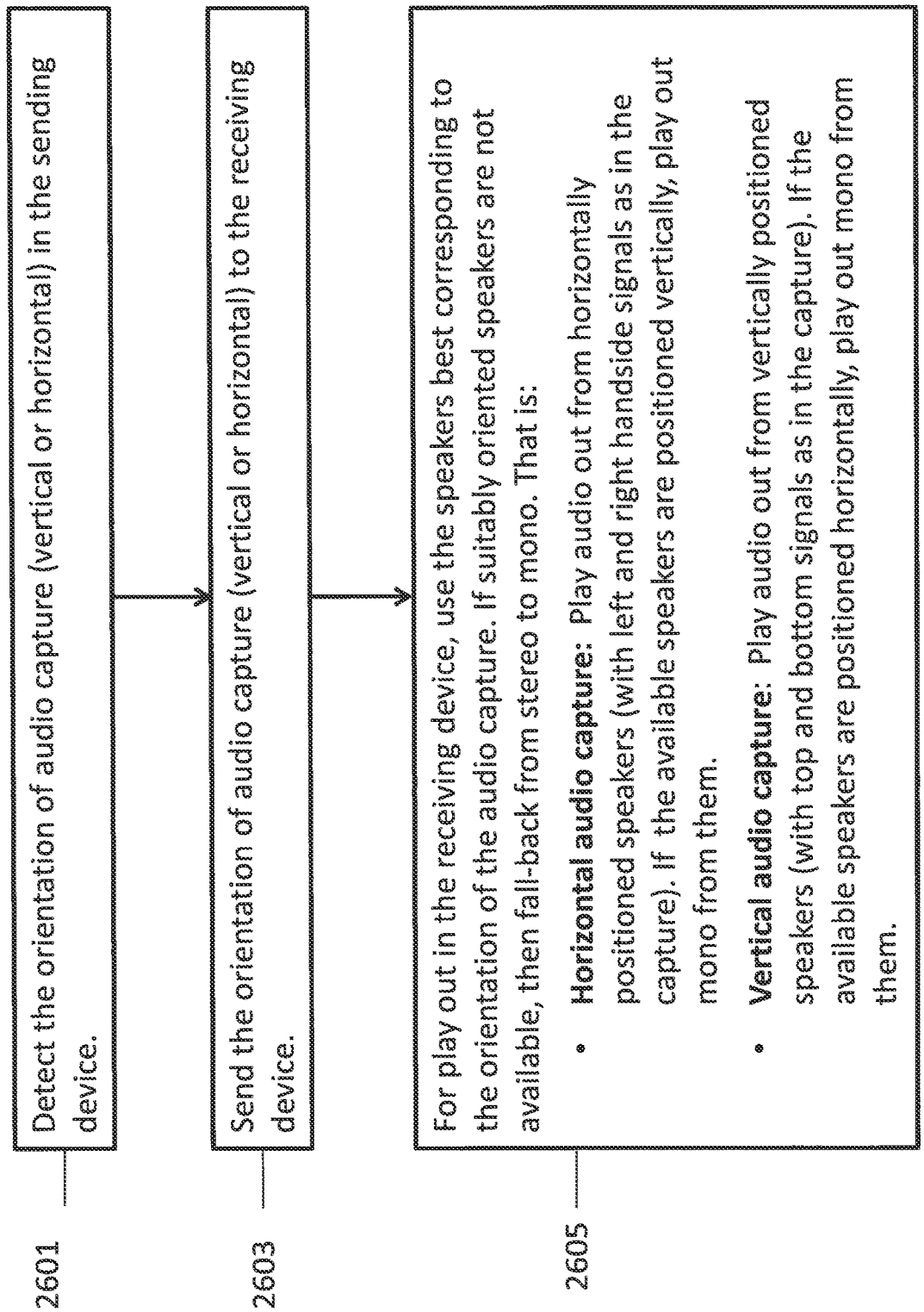
FIG. 27 shows schematically a further flow diagram of the operation of audio recording and playback systems with horizontal and vertical orientation sensing according to some embodiments.
Figure 28:
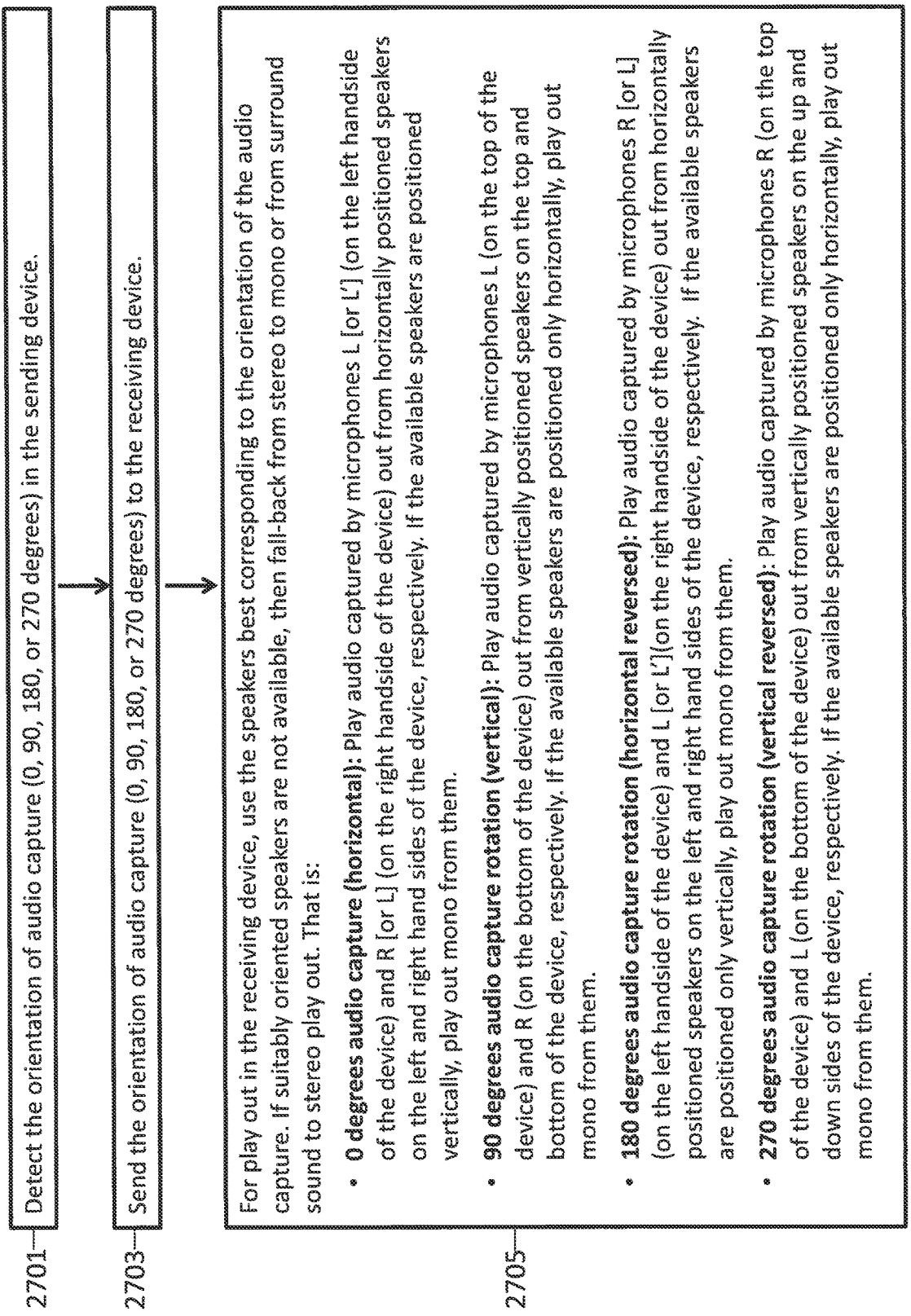
FIG. 28 shows schematically a flow diagram of the operation of audio recording and playback systems with quartile orientation sensing according to some embodiments.

With respect to FIGS. 26 to 28 example system overview operations are shown as flow charts.

For example in some embodiments the system apparatus are configured to detect the orientation of audio capture (xxx degrees) in the sending device as shown in FIG. 26 in step 2501

Furthermore the recording or capture apparatus in some embodiments is configured to send the orientation of audio capture (xxx degrees) to the receiving device with suitable granularity (and based on the accuracy of the gravitation detector in the recording apparatus). This is shown in FIG. 26 in step 2503.

In some embodiments the playback within the receiving apparatus is configured to use the speakers best corresponding to the orientation of the audio capture. If suitably oriented speakers are not available, then a fall-back from stereo to mono or from surround sound to stereo playback is generated. This is shown in FIG. 26 by step 2505.

In some embodiments, such as shown in the flow chart in FIG. 27, the sending or recording apparatus is configured to determine or detect the orientation of audio capture (defined as either vertical or horizontal) within the sending apparatus. The recording apparatus orientation determination is shown in FIG. 27 by step 2601.

The sending apparatus can then in some embodiments send the orientation of audio capture (vertical or horizontal) to the receiving or playback apparatus. The operation of sending the orientation of audio capture is shown in FIG. 27 by step 2603.

In some embodiments the playback of the audio signals in the receiving apparatus is configured such that the playback apparatus uses the speakers best corresponding to the orientation of the audio capture. If suitably oriented speakers are not available, then the playback apparatus can be configured to fall-back from stereo to mono. In other words for Horizontal Audio Capture:

Play audio out from horizontally positioned speakers (with the left and right hand side signals as in the capture). If the available speakers are positioned vertically, play out mono from them.

Vertical Audio Capture:

Play audio out from vertically positioned speakers (with the top and bottom signals as in the capture). If the available speakers are positioned horizontally, play out mono from them.

The use of suitably orientated speakers is shown in FIG. 27 by step 2605.

Note that if only binary information on audio orientation (horizontal vs. vertical) as shown in FIG. 27 is sent (one bit), capturing and rendering devices are synchronised to use the same audio output order. In other words both the capturing and the rendering devices are configured to know which signal is sent first in horizontal capture (for example is the audio output order "left, right" or "right, left") and in vertical capture (for example is the audio output order: "top, bottom" or "bottom, top"). The synchronisation information is required to prevent the audio playback having the possibility of an error of 180 degrees.

Table I shows examples of the application of the embodiments shown in FIG. 27 describing the relationship between capture device orientation, audio (capture) orientation and audio output order for some of the examples illustrated in the Figures. In such circumstances the audio orientation is signalled via AOS from the sending device to the receiving device when deviation from the default (horizontal orientation in this example embodiment) occurs. In other words audio orientation is signalled via AOS from the sending device to the receiving device for the cases marked with star (*) in the Table. Audio output order is also made known to both the sending and receiving device, for example by also it being sent from the sending device to the receiving device.

TABLE I

Example of the relationship between capture device orientation, audio (capture) orientation and audio output order.

| Case | Orientation of capture apparatus | Audio (capture) orientation (signalled via AOS) | Audio output order (made known to sender and receiver) |
|---|---|---|---|
| FIG. 8 | 0 degrees | Horizontal | L, R, (L') |
| FIG. 9 | 90 degrees | Horizontal | L', L, (R) |
| FIG. 10 | 180 degrees | Horizontal | R, L, (L') |
| FIG. 11 | 270 degrees | Horizontal | L, L', (R) |
| FIG. 12 | 0 degrees | Horizontal | L, R |
| FIG. 13 | 90 degrees | Vertical * | L, R |
| FIG. 14 | 180 degrees | Horizontal | R, L |
| FIG. 15 | 270 degrees | Vertical * | R, L |

It would be understood that in some embodiments sending two (monophonic) audio signals from the capturing device to the receiving or rendering device is sufficient for reproducing stereo (for vertical and horizontal orientation), and therefore knowledge of the two first components in the audio output order is sufficient and reflected by the third component being shown inside brackets in the table.

In one embodiment, the sending device has only two microphones (shown in FIGS. 12-15). In these cases the audio output order can be signalled with only one bit.

In some embodiments the sending (recording or capture) apparatus is configured to determine or detect the orientation of audio capture (0, 90, 180, or 270 degrees) in the sending apparatus. The detecting of the orientation is shown in FIG. 28 by step 2701.

Furthermore in some embodiments the sending apparatus can be configured to send the orientation of audio capture (0, 90, 180, or 270 degrees) to the receiving apparatus via AOS. The operation of sending the orientation information is shown in FIG. 28 by step 2703.

In such embodiments the receiving device is configured to playback the audio signal and further configured to use the speakers best corresponding to the orientation of the audio capture. If suitably oriented speakers are not available then the receiving apparatus is configured to fall-back from stereo to mono or from surround sound to stereo play out or in general to downmixing audio from multi channels to fewer channels. This can be shown as the following operations 0 Degrees Audio Capture (Horizontal):

Play audio captured by microphones L (or L' which may happen in the 3 microphone case) (on the left hand side of the device) and R (or L) (on the right hand side of the device) out from horizontally positioned speakers on the left and right hand sides of the device, respectively. If the available speakers are positioned vertically, play out mono from them.

90 Degrees Audio Capture Rotation (Vertical):

Play audio captured by microphones L (on the top of the device) and R (on the bottom of the device) out from vertically positioned speakers on the top and bottom of the device, respectively. If the available speakers are positioned only horizontally, play out mono from them.

180 Degrees Audio Capture Rotation (Horizontal Reversed):

Play audio captured by microphones R (or L) (on the left hand side of the device) and L (or L') (on the right hand side of the device) out from horizontally positioned speakers on the left and right hand sides of the device, respectively. If the available speakers are positioned only vertically, play out mono from them.

270 Degrees Audio Capture Rotation (Vertical Reversed):

Play audio captured by microphones R (on the top of the device) and L (on the bottom of the device) out from vertically positioned speakers on the top and bottom of the device, respectively. If the available speakers are positioned only horizontally, play out mono from them.

The operation of performing playback of the audio signal using the speakers best corresponding to the orientation of the audio capture is shown in FIG. 28 by step 2705.

Note that in some embodiments, for example the operations performed as shown in the case of FIG. 28, the audio output order within horizontal and vertical capture can be included into the above (2 bit) AOS signalling via the choice of 0 vs. 180 degrees for horizontal capture and 90 vs. 270 degrees for vertical capture. In such embodiments, the audio output order for the two signals forming stereo is signalled by the AOS data. In such embodiments the compact signalling requires that the capturing device (where the capturing device has more than 2 microphones) only sends the two signals sufficient for producing stereo (in other words in the case where there are three microphones the capturing device drops the signals shown inside brackets in Table I from the bit-stream from being sent to the receiving device).

Table II shows examples of the application of the embodiments shown in FIG. 28 of the relationship between capture device orientation and audio (capture) orientation. Audio orientation in such embodiments is sent via AOS when deviation from the default (horizontal non-reversed orientation in this example embodiment) occurs. In other words the audio orientation is sent in the cases marked with star (*) in the following table.

TABLE II

Example of the relationship between capture device orientation and audio (capture) orientation.

| Case | Orientation of capture apparatus | Audio (capture) orientation (signalled via AOS) |
| --- | --- | --- |
| FIG. 8 | 0 degrees | Horizontal |
| FIG. 9 | 90 degrees | Horizontal |
| FIG. 10 | 180 degrees | Horizontal reversed * |
| FIG. 11 | 270 degrees | Horizontal reversed * |
| FIG. 12 | 0 degrees | Horizontal |
| FIG. 13 | 90 degrees | Vertical * |
| FIG. 14 | 180 degrees | Horizontal reversed * |
| FIG. 15 | 270 degrees | Vertical reversed * |

In some embodiments a particular audio capture orientation (for example horizontal audio capture orientation) can be preferred. In some embodiments the preferred audio capture orientation can be used (in other words signalled by AOS) even though the audio capture orientation is closer to another orientation. For example in some embodiments a horizontal audio capture orientation can be used (in other words signalled via AOS) even though the difference from horizontal orientation exceeds 45 degrees.

In some embodiments, where the receiving device is capable of playing out the audio signal only with lower granularity of orientation than what is signalled via AOS, the receiving device may use for play out the closest orientation it supports (possibly with preference for a certain orientation such as horizontal). In some embodiments the receiving device can further prefer a specific output format, for example stereo playout, rather than switching to play the signal as mono, or in some embodiments the receiving device may simultaneously play out the audio signal from more than one speaker with suitable scaling applied for the playout for each speaker making the audio signal to appear as coming from between the speakers (i.e. from orientations between the speakers).

It would be understood that the speakers can comprise any suitable audio transducer output device including loudspeakers; headphones; headsets; earpieces; external loudspeakers; and integrated hands free speakers.

It shall be appreciated that the term user equipment is intended to cover any suitable type of wireless user equipment, such as mobile telephones, portable data processing devices or portable web browsers, as well as wearable devices.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
generating at least two audio signals respectively from at least two microphones, a first of the at least two audio signals captured at a first microphone positioned at a first location and a second of the at least two audio signals captured at a second microphone positioned at a second location, the first microphone having a relative displacement with respect to the second microphone;

determining an audio capture orientation based on location information of the at least two microphones, the audio capture orientation being associated with the at least two audio signals from the at least two microphones including the relative displacement between the first microphone and the second microphone, wherein the audio capture orientation or an indication associated with the audio capture orientation enables playback of the at least two audio signals to be processed based on the audio capture orientation or the indication associated with the audio capture orientation such that the playback of the at least two audio signals is aligned to an arrangement of the at least two microphones when capturing the at least two audio signals; and reproducing the at least two audio signals having the aligned arrangement during playback.

2. The method as claimed in claim 1, further comprising:
determining, if a difference between an orientation value of the audio capture orientation and an earlier orientation value of the audio capture orientation is greater than a defined value; and outputting the orientation value of the audio capture orientation or the indication associated with the audio capture orientation with the at least two audio signals, such that the playback of the at least two audio signals is performed based on the orientation value of the audio capture orientation or the indication associated with the audio capture orientation with the at least two audio signals.

3. The method as claimed in claim 1, further comprising:
determining, an audio output order for the at least two audio signals based on the audio capture orientation or the indication associated with the audio capture orientation with the at least two audio signals; and outputting, the audio output order with the at least two audio signals, such that the playback of the at least two audio signals is further performed based on the audio output order.

4. The method as claimed in claim 3, further comprising:
determining, a difference between the orientation value of the audio capture orientation and an earlier orientation value of the audio capture orientation is greater than a defined audio output re-ordering value, and triggering, the determining of the audio output order when the difference between the orientation value of the audio capture orientation and the earlier orientation value of the audio capture orientation is greater than the defined audio output re-ordering value.

5. The method as claimed in claim 1, wherein generating, the at least two audio signals comprises:
generating the first of the at least two audio signals with the first microphone at the first location; and generating the second of the at least two audio signals with the second microphone at the second location, the relative displacement between the first microphone and the second microphone being the displacement between the first location and the second location.

6. The method as claimed in claim 1, wherein generating, the at least two audio signals comprises at least one of:

receiving the at least two audio signals from a remote apparatus comprising at least two microphones having the relative displacement; and receiving the at least two audio signals from a memory.

7. The method as claimed in claim 1, further caused to:
receive configuration information associated with the at least two microphones; and determine the audio capture orientation based on the configuration information, wherein the configuration information comprises information related to a number of microphones, location of the microphones and relative positioning of the microphones to each other, or capture directionality of the microphones.

8. A method comprising:
receiving, by a playback device, at least two audio signals respectively from at least two microphones with audio capture orientation information, the audio capture orientation information being associated with the at least two audio signals from the at least two microphones including a relative displacement between a first microphone and a second microphone, wherein a first of the at least two audio signals is captured at the first microphone positioned at a first location and a second of the at least two audio signals is captured at the second microphone positioned at a second location, the first microphone having the relative displacement with respect to the second microphone, wherein the audio capture orientation information or an indication associated with the audio capture orientation information enables playback of at least two speakers to be processed based on the audio capture orientation information or the indication associated with the audio capture orientation information such that playback of the at least two audio signals is aligned to an arrangement of the at least two microphones when capturing the at least two audio signals; and reproducing the at least two audio signals for outputting to the at least two speakers having the aligned arrangement during playback.

9. The method as claimed in claim 8, further comprises processing the at least two audio signals according to an initial audio output order.

10. The method as claimed in claim 8, further comprising:
receiving an audio output order for the at least two audio signals; and processing the at least two audio signals such that the playback of the at least two audio signals is further performed based on the audio output order.

11. The method as claimed in claim 8, wherein outputting the at least two audio signals to at least two speakers comprises at least one of:
routing the at least two audio signals to the at least two speakers based on the playback orientation; and mixing the at least two audio signals to generate a downmixed audio signal to be output to at least one of the at least two speakers.

12. An apparatus comprising at least one processor and at least one memory including computer code for one or more programs, the at least one memory and the computer code configured to with the at least one processor cause the apparatus to at least:

generate at least two audio signals respectively from at least two microphones, a first of the at least two audio signals captured at a first microphone positioned at a first location and a second of the at least two audio signals captured at a second microphone positioned at a second location, the first microphone having a relative displacement with respect to the second microphone;

determine an audio capture orientation based on location information of the at least two microphones, the audio capture orientation being associated with the at least two audio signals from the at least two microphones including the relative displacement between the first microphone and the second microphone, wherein the audio capture orientation or an indication associated with the audio capture orientation enables playback of the at least two audio signals to be processed based on the audio capture orientation or the indication associated with the audio capture orientation such that the playback of the at least two audio signals is aligned to an arrangement of the at least two microphones when capturing the at least two audio signals; and reproduce the at least two audio signals having the aligned arrangement during playback.

13. The apparatus as claimed in claim 12, further caused to:

determine, if a difference between an orientation value of the audio capture orientation and an earlier orientation value of the audio capture orientation is greater than a defined value; and output the orientation value of the audio capture orientation or the indication associated with the audio capture orientation with the at least two audio signals, such that the playback of the at least two audio signals is performed based on the orientation value of the capture orientation or the indication associated with the audio capture orientation with the at least two audio signals.

14. The apparatus as claimed in claim 12, further caused to perform:

determine, an audio output order for the at least two audio signals based on the audio capture orientation or the indication associated with the audio capture orientation with the at least two audio signals; and output, the audio output order with the at least two audio signals, such that the playback of the at least two audio signals is further performed based on the audio output order.

15. The apparatus as claimed in claim 14, further caused to:

determine, a difference between the orientation value of the audio capture orientation and an earlier orientation value of the audio capture orientation is greater than a defined audio output re-ordering value, and trigger, the determining of the audio output order when the difference between the orientation value of the audio capture orientation and the earlier orientation value of the audio capture orientation is greater than the defined audio output re-ordering value.

16. The apparatus as claimed in claim 12, further caused to:

generate the first of the at least two audio signals with the first microphone at the first location; and generate the second of the at least two audio signals with the second microphone at the second location, the relative displacement between the first microphone and the second microphone being the displacement between the first location and the second location.

17. The apparatus as claimed in claim 12, further caused to:

receive the at least two audio signals from a remote apparatus comprising at least two microphones having the relative displacement.

18. An apparatus comprising at least one processor and at least one memory including computer code for one or more programs, the at least one memory and the computer code configured to with the at least one processor cause the apparatus to:

receive at least two audio signals respectively from at least two microphones with audio capture orientation information, the audio capture orientation information being associated with the at least two audio signals from the at least two microphones including a relative displacement between a first microphone and a second microphone, wherein a first of the at least two audio signals is captured at the first microphone positioned at a first location and a second of the at least two audio signals is captured at the second microphone positioned at a second location, the first microphone having the relative displacement with respect to the second microphone, wherein the audio capture orientation information or an indication associated with the audio capture orientation information enables playback of at least two speakers to be processed based on the audio capture orientation information or the indication associated with the audio capture orientation information such that playback of the at least two audio signals is aligned to an arrangement of the at least two microphones when capturing the at least two audio signals; and reproduce the at least two audio signals for outputting to the at least two speakers having the aligned arrangement during playback.

19. The apparatus as claimed in claim 18, further comprises processing the at least two audio signals according to an initial audio output order.

20. The apparatus as claimed in claim 18, further caused to perform:

receive an audio output order for the at least two audio signals; and process the at least two audio signals such that the playback of the at least two audio signals is further performed based on the audio output order.

21. The apparatus as claimed in claim 18, further caused to output the at least two audio signals to at least two speakers by at least:

routing the at least two audio signals to the at least two speakers based on the playback orientation; and mixing the at least two audio signals to generate a downmixed audio signal to be output to at least one of the at least two speakers.

* * * * *